United States Patent
Zhang et al.

(10) Patent No.: US 12,282,411 B2
(45) Date of Patent: Apr. 22, 2025

(54) PROGRAM IMPROVEMENT USING LARGE LANGUAGE MODELS

(71) Applicant: Microsoft Technology Licensing, LLC, Redmond, WA (US)

(72) Inventors: Jialu Zhang, New Haven, CT (US); José Pablo Cambronero Sánchez, New Haven, CT (US); Gustavo Araujo Soares, Seattle, WA (US); Vu Minh Le, Redmond, WA (US); Sumit Gulwani, Sammamish, WA (US); Gust Ben Anneloes Verbruggen, Keerbergen (BE)

(73) Assignee: Microsoft Technology Licensing, LLC, Redmond, WA (US)

( * ) Notice: Subject to any disclaimer, the term of this patent is extended or adjusted under 35 U.S.C. 154(b) by 164 days.

(21) Appl. No.: 18/159,712

(22) Filed: Jan. 26, 2023

(65) Prior Publication Data
US 2024/0256423 A1 Aug. 1, 2024

(51) Int. Cl.
*G06F 11/36* (2006.01)
*G06F 8/41* (2018.01)
*G06F 8/71* (2018.01)
*G06F 11/3604* (2025.01)

(52) U.S. Cl.
CPC ............ *G06F 11/3608* (2013.01); *G06F 8/42* (2013.01); *G06F 8/71* (2013.01)

(58) Field of Classification Search
CPC ........... G06F 8/71; G06F 8/42; G06F 11/3608
See application file for complete search history.

(56) References Cited

U.S. PATENT DOCUMENTS

| | | |
|---|---|---|
| 2003/0131337 A1 | 7/2003 | Perumainar |
| 2015/0135166 A1 | 5/2015 | Tarlow et al. |
| 2018/0150742 A1* | 5/2018 | Woulfe ............... G06F 11/3608 |
| 2019/0227902 A1* | 7/2019 | Cheng ................. G06F 11/3608 |
| 2019/0287029 A1* | 9/2019 | Sobran ...................... G06F 8/71 |
| 2019/0324886 A1 | 10/2019 | Champlin-Scharff et al. |
| 2020/0097389 A1 | 3/2020 | Smith et al. |
| 2021/0182039 A1* | 6/2021 | Cappello ................. G06N 20/00 |
| 2021/0192321 A1* | 6/2021 | Zhang ..................... G06F 8/427 |
| 2021/0240453 A1* | 8/2021 | Badlani .................... G06F 8/42 |
| 2021/0271587 A1* | 9/2021 | Miller .................... G06N 20/00 |
| 2022/0121554 A1 | 4/2022 | Das et al. |

(Continued)

OTHER PUBLICATIONS

Santos et al., "Syntax and Sensibility: Using Language Models to Detect and Correct Syntax Errors" (Year: 2018).*

(Continued)

*Primary Examiner* — Phillip H Nguyen
(74) *Attorney, Agent, or Firm* — Ogilvie Law Firm

(57) ABSTRACT

Some embodiments generate prompts and submit them in queries to a language model trained on code to perform automated program repair. Some embodiments fix syntactic mistakes and semantic mistakes by combining multimodal prompts, iterative querying, test-case-based selection of few-shots, and program chunking. In some cases, edit distance is minimized between an initial flawed program and the automatically created improved version of that program. The initial flawed program is obtained from a programming student, or from a source code generator.

20 Claims, 6 Drawing Sheets

(56) References Cited

U.S. PATENT DOCUMENTS

2022/0405091 A1* 12/2022 Mahanta ................. G06N 3/10

OTHER PUBLICATIONS

Y. Ke, K. T. Stolee, C. Le Goues, and Y. Brun, "Repairing programs with semantic code search (t)," in 2015 30th IEEE/ACM International Conference on Automated Software Engineering (ASE). IEEE, no later than Dec. 31, 2015, pp. 295-306.

Jiajun Jiang, et al., "Shaping Program Repair Space with Existing Patches and Similar Code", https://doi.org/10.1145/3213846. 3213871, Jul. 16-21, 2018, 12 pages.

Kaizhong Zhang, et al., "Approximate Tree Matching in the Presence of Variable Length Don't Cares", Jan. 18, 1993, 30 pages.

U. Z. Ahmed, p. Kumar, A. Karkare, p. Kar, and S. Gulwani, "Compilation error repair: for the student programs, from the student programs," in Proceedings of the 40th International Conference on Software Engineering: Software Engineering Education and Training, May 27-Jun. 3, 2018, pp. 78-87.

C. Wong, P. Santiesteban, C. K¨astner, and C. Le Goues, "Varfix: balancing edit expressiveness and search effectiveness in automated program repair," in ESEC/FSE '21: 29th ACM Joint European Software Engineering Conference and Symposium on the Foundations of Software Engineering. ACM, Aug. 23-28, 2021, pp. 354-366.

Claire Le Goues, et al., "Current challenges in automatic software repair", DOI 10.1007/s11219-013-9208-0, Jun. 7, 2013, 23 pages.

C. Le Goues, T. Nguyen, S. Forrest, and W. Weimer, "Genprog: A generic method for automatic software repair," IEEE Transactions on Software Engineering, vol. 38, No. 1, pp. 54-72, Mar. 16, 2010.

Jialu Zhang, et al., "Repairing Bugs in Python Assignments Using Large Language Models", arXiv:2209.14876v1 [cs. SE] Sep. 29, 2022, 12 pages.

"Your AI pair programmer", https://github.com/features/copilot/, no later than Jan. 18, 2023.

Berger, Emery. "Coping with Copilot." Aug. 10, 2022, https://www.sigarch.org/coping-with-copilot/, 14 pages.

"New GPT-3 Capabilities: Edit & Insert." Mar. 15, 2022. OpenAI. https://openai.com/blog/gpt-3-edit-insert/, 6 pages.

Singer, Natash. Jan. 24, 2019. "The Hard Part of Computer Science? Getting Into Class." The New York Times, January. https://www.nytimes.com/2019/01/24/technology/computer-science-courses-college.html, 3 pages.

"Tabnine." Dec. 12, 2022. https://github.com/codota/TabNine, 2 pages.

H. Laurenc, on, L. Saulnier, T. Wang, C. Akiki, A. V. del Moral, T. Le Scao, L. Von Werra, C. Mou, E. G. Ponferrada, H. Nguyen et al., "The bigscience corpus a 1.6 tb composite multilingual dataset.", no later than Dec. 31, 2022, 18 pages.

K. Wang, R. Singh, and Z. Su, "Search, align, and repair: Data-driven feedback generation for introductory programming exercises," ser. PLDI 2018. New York, NY, USA: Association for Computing Machinery, Nov. 20, 2017, p. 481-495.

K. Wang, Z. Su, and R. Singh, "Dynamic neural program embeddings for program repair," in International Conference on Learning Representations, Jun. 30, 2018, 12 pages.

Chhatbar, U. Z. Ahmed, and P. Kar, "Macer: A modular framework for accelerated compilation error repair," in Artificial Intelligence in Education: 21st International Conference, AIED 2020, Ifrane, Morocco Proceedings, May 28, 2020, 20 pages.

T. B. Brown et al., "Language models are few-shot learners," in NeurIPS 2020, Jul. 22, 2020, 75 pages.

Dan Hendrycks, et al., "Measuring Coding Challenge Competence With APPS", arXiv:2105.09938v3 [cs.SE] Nov. 8, 2021, 22 pages.

M. Yasunaga and P. Liang, "Break-it-fix-it: Unsupervised learning for program repair," in ICML, ser. Proceedings of Machine Learning Research, vol. 139. PMLR, Jun. 22, 2021, pp. 11 941-11 952.

M. Chen et al., "Evaluating large language models trained on code," arXiv:2107.03374v2 [cs.LG] Jul. 14, 2021, 35 pages.

Y. Lu, N. Meng, and W. Li, "FAPR: fast and accurate program repair for introductory programming courses," CoRR, vol. abs/2107.06550, Jul. 14, 2021. [Online]. Available: https://arxiv:org/abs/2107:06550, 15 pages.

P. Liu, W. Yuan, J. Fu, Z. Jiang, H. Hayashi, and G. Neubig, "Pre-train, prompt, and predict: A systematic survey of prompting methods in natural language processing," arXiv preprint arXiv:2107.13586, Jul. 28, 2021, 46 pages.

G. Poesia, O. Polozov, V. Le, A. Tiwari, G. Soares, C. Meek, and S. Gulwani, "Synchromesh: Reliable code generation from pre-trained language models," arXiv preprint arXiv:2201.11227, Jan. 26, 2022, 19 pages.

Y. Li et al., "Competition-level code generation with AlphaCode," arXiv:2203.07814v1 [cs.PL] Feb. 8, 2022, 74 pages.

Erik Nijkamp, et al., "Codegen: an Open Large Language Model for Code With Multi-Turn Program Synthesis", arXiv:2203.13474v4 [cs.LG] Sep. 29, 2022, 22 pages.

J. Zhang, D. Li, J. C. Kolesar, H. Shi, and R. Piskac, "Automated feedback generation for competition-level code," CORR, vol. abs/2206.01848, Jun. 3, 2022. [Online]. Available: https://doi:org/10:48550/arXiv:2206:01848, 12 pages.

C. S. Xia and L. Zhang, "Less training, more repairing please: Revisiting automated program repair via zero-shot earning," arXiv preprint arXiv:2207.08281, Jul. 26, 2022, 13 pages.

H. Joshi, J. Cambronero, S. Gulwani, V. Le, I. Radicek, and G. Verbruggen, "Repair is nearly generation: Multilingual program repair with IIms," arXiv preprint arXiv:2208.11640, Dec. 5, 2022, 13 pages.

Sven Apel, et al., "Semistructured Merge: Rethinking Merge in Revision Control Systems", ESEC/FSE'11, Sep. 5-9, 2011, Szeged, Hungary, 11 pages.

R. Singh, S. Gulwani, and A. Solar-Lezama, "Automated feedback generation for introductory programming assignments," in Proceedings of the 34th ACM SIGPLAN Conference on Programming Language Design and Implementation, ser. PLDI 13. New York, NY, USA: Association for Computing Machinery, Jun. 16-19, 2013, p. 15-26.

Y. Qi, X. Mao, Y. Lei, Z. Dai, and C. Wang, "The strength of random search on automated program repair," in Proceedings of the 36th International Conference on Software Engineering, ser. ICSE 2014, New York, NY, USA, May 31-Jun. 7, 2014, p. 254-265.

A. Altadmri and N. C. Brown, "37 million compilations: Investigating novice programming mistakes in large-scale student data," in Proceedings of the 46th ACM Technical Symposium on Computer Science Education, ser. SIGCSE '15. New York, NY, USA: Association for Computing Machinery, Mar. 4-7, 2015, p. 522-527.

F. Long and M. Rinard, "Automatic patch generation by learning correct code," in Proceedings of the 43rd Annual ACM SIGPLAN-SIGACT Symposium on Principles of Programming Languages, ser. POPL '16. New York, NY, USA: Association for Computing Machinery, Jan. 20-22, 2016, p. 298-312.

S. Mechtaev, J. Yi, and A. Roychoudhury, "Angelix: Scalable multiline program patch synthesis via symbolic analysis," In 2016 IEEE/ACM 38th International Conference on Software Engineering (ICSE), May 14-22, 2016, pp. 691-701.

Shalini Kaleeswaran, et al., "Semi-supervised Verified Feedback Generation", http://dx.doi.org/10.1145/2950290.2950363, Nov. 13-18, 2016, 12 pages.

Y. Pu, K. Narasimhan, A. Solar-Lezama, and R. Barzilay, "Sk p: A neural program corrector for moocs," in Companion Proceedings of the 2016 ACM SIGPLAN International Conference on Systems, Programming, Languages and Applications: Software for Humanity, ser. SPLASH Companion 2016. New York, NY, USA: Association for Computing Machinery, Oct. 30-Nov. 4, 2016, p. 39-40.

F. Long, P. Amidon, and M. Rinard, "Automatic inference of code transforms for patch generation," in Proceedings of the 2017 11th Joint Meeting on Foundations of Software Engineering, ser. ESEC/FSE 2017. New York, NY, USA: Association for Computing Machinery, No. later than Dec. 31, 2017, p. 727-739.

J. Yi, U. Z. Ahmed, A. Karkare, S. H. Tan, and A. Roychoudhury, "A feasibility study of using automated program repair for introductory programming assignments," in Proceedings of the 2017 11th Joint Meeting on Foundations of Software Engineering, ser.

(56) References Cited

OTHER PUBLICATIONS

ESEC/FSE 2017. New York, NY, USA: Association for Computing Machinery, Sep. 4-8, 2017, p. 740-751.
Guilherme Cavalcanti, et al., "Evaluating and Improving Semistructured Merge", https://doi.brg/10.1145/3133883, no later than Oct. 31, 2017, 27 pages.
Q. Xin and S. P. Reiss, "Leveraging syntax-related code for automated program repair," in Proceedings of the 32nd IEEE/ACM International Conference on Automated Software Engineering, ser. ASE 2017. IEEE Press, no later than Dec. 31, 2017, p. 660-670.
Junho Lee, et al., "Automatic Diagnosis and Correction of Logical Errors for Functional Programming Assignments", https://doi.org/10.1145/3276528, no later than Nov. 30, 2018, 30 pages.
S. Gulwani, I. Radicek, and F. Zuleger, "Automated clustering and program repair for introductory programming assignments," SIGPLAN Not., vol. 53, No. 4, p. 465-480, Jun. 18-22, 2018.
David M. Perry, et al., "SemCluster: Clustering of Imperative Programming Assignments Based on Quantitative Semantic Features", https://doi.org/10.1145/3314221.3314629, Jun. 22-26, 2019, 14 pages.
R. Shariffdeen, Y. Noller, L. Grunske, and A. Roychoudhury, "Concolic program repair," in Proceedings of the 42nd Acm Sigplan International Conference on Programming Language Design and Implementation, ser. PLDI 2021. New York, NY, USA: Association for Computing Machinery, Jun. 20-25, 2021, p. 390-405.
D. Song, W. Lee, and H. Oh, Context-Aware and Data-Driven Feedback Generation for Programming Assignments. New York, NY, USA: Association for Computing Machinery, Aug. 23-28, 2021, p. 328-340.
U. Z. Ahmed, Z. Fan, J. Yi, O. I. Al-Bataineh, and A. Roychoudhury, "Verifix: Verified repair of programming assignments," ACM Trans. Softw. Eng. Methodol., vol. 31, No. 4, no later than Jul. 31, 2022, 31 pages.
J. Finnie-Ansley, P. Denny, B. A. Becker, A. Luxton-Reilly, and J. Prather, "The robots are coming: Exploring the implications of openai codex on introductory programming," in Australasian Computing Education Conference, ser. ACE '22. New York, NY, USA: Association for Computing Machinery, Feb. 14-18, 2022, p. 10-19.
J. Zhang, T. Mytkowicz, M. Kaufman, R. Piskac, and S. K. Lahiri, "Using pre-trained language models to resolve textual and semantic merge conflicts (experience paper)," in ISSTA. ACM, Jul. 18-22, 2022, pp. 77-88.
Y. Hu, U. Z. Ahmed, S. Mechtaev, B. Leong, and A. Roychoudhury, "Refactoring based program repair applied to programming assignments," in 2019 34th IEEE/ACM International Conference on Automated Software Engineering (ASE), no later than Dec. 31, 2019, pp. 388-398.
C. Le Goues, M. Pradel, and A. Roychoudhury, "Automated program repair," Commun. ACM, vol. 62, No. 12, p. 56-65, no later than Dec. 31, 2019.
Luca Gazzola, et al., "Automatic Software Repair: A Survey", Digital Object Identifier No. 10.1109/TSE.2017.2755013, Aug. 6, 2016, 34 pages.
Loris D'Antoni, et al., "Qlose: Program Repair with Quantitative Objectives", Jul. 1, 2016, 19 pages.
L. Li, H. Liu, K. Li, Y. Jiang, and R. Sun, "Generating concise patches for newly released programming assignments," IEEE Transactions on Software Engineering, no later than Dec. 31, 2021, 18 pages.
R. W. Hamming, "Error detecting and error correcting codes," The Bell System Technical Journal, vol. 29, No. 2, pp. 147-160, no later than Dec. 31, 1950.
I. Drosos, P. J. Guo, and C. Parnin, "Happyface: Identifying and predicting frustrating obstacles for learning programming at scale," in 2017 IEEE Symposium on Visual Languages and Human-Centric Computing (VL/HCC), no later than Dec. 31, 2017, pp. 171-179.
E. Dinella, H. Dai, Z. Li, M. Naik, L. Song, and K. Wang, "Hoppity: Learning graph transformations to detect and fix bugs in programs," in 8th International Conference on Learning Representations, ICLR 2020, Addis Ababa, Ethiopia, Apr. 26-30, 2020. OpenReview.net, 17 pages.
S. Mechtaev, M. Nguyen, Y. Noller, L. Grunske, and A. Roychoudhury, "Semantic program repair using a reference implementation," in Proceedings of the 40th International Conference on Software Engineering, ICSE 2018, Gothenburg, Sweden, May 27-Jun. 3, 2018, M. Chaudron, I. Crnkovic, M. Chechik, and M. Harman, Eds. ACM, pp. 129-139.
R. Rolim, G. Soares, L. D'Antoni, O. Polozov, S. Gulwani, R. Gheyi, R. Suzuki, and B. Hartmann, "Learning syntactic program transformations from examples," in ICSE 2017, no later than Apr. 30, 2017, 12 pages.
E. Dinella, G. Ryan, T. Mytkowicz, and S. K. Lahiri, "TOGA: A neural method for test oracle generation," in 44th IEEE/ACM 44th International Conference on Software Engineering, ICSE 2022, Pittsburgh, PA, USA, May 25-27, 2022. ACM, May 21-29, 2022, pp. 2130-2141.
D. Kim, J. Nam, J. Song, and S. Kim, "Automatic patch generation learned from human-written patches," in Proceedings of the 2013 International Conference on Software Engineering, ser. ICSE '13. IEEE Press, no later than Dec. 31, 2013, p. 802-811.
K. Rahmani, M. Raza, S. Gulwani, V. Le, D. Morris, A. Radhakrishna, G. Soares, and A. Tiwari, "Multi-modal program Inference: a marriage of pre-trained language models and component-based synthesis," Proc. ACM Program. Lang., vol. 5, No. OOPSLA, pp. 1-29, no later than Aug. 31, 2021.
G. Verbruggen, V. Le, and S. Gulwani, "Semantic programming by example with pre-trained models," Proc. ACM Program. Lang., vol. 5, No. OOPSLA, pp. 1-25, no later than Oct. 31, 2021.

\* cited by examiner

| INCORRECT | IMPROVED |
|---|---|
| 1  a=int(input()) | 1  a,b = map(int, |
| 2  b=int(input()) |        input().split(',')) |
| 3  n=str(a) | 2  n=str(a) |
| 4  m=str(b) | 3  m=str(b) |
| 5  n1=n[::-1] | 4  n1=n[::-1] |
| 6  m1=m[::-1] | 5  m1=m[::-1] |
| 7  x=int(n1) | 6  x=int(n1) |
| 8  y=int(m1) | 7  y=int(m1) |
| 9  if x>1: | 8  def prime(z): |
| 10     for i in range(2, x): | 9      if z>1: |
| 11         if (x%i)==0: | 10         for i in range(2,z): |
| 12             p=0 | 11             if (z%i)==0: |
| 13             break | 12                 return 0 |
| 14         else: | 13                 break |
| 15             p=1 | 14             else: |
| 16  else: | 15                 return 1 |
| 17     p=0 | 16         else: |
| 18  if y>1: | 17             return 0 |
| 19     for j in range(2, y): | 18  p=prime(x) |
| 20         if (y%j)==0: | 19  q=prime(y) |
| 21             q=0 | 20  if p==1 and q==1: |
| 22             break | 21      g=x+y |
| 23         else: | 22      print(g) |
| 24             q=1 | 23  elif p==1 or q==1: |
| 25  else: | 24      h=a+b |
| 26     q=0 | 25      print(h) |
| 27  if p==1 and q==1: | 26  else: |
| 28     g=x+y | 27      print(a*b) |
| 29     print(g) | |
| 30  elif p=1 or q=1: | |
| 31     h=a+b | |
| 32     print(h) | |
| 33  else: | |
| 34     print(a*b) | |

Fig. 4

| INCORRECT | IMPROVED |
|---|---|
| 1  i = input() | 1  i = input() |
| 2  S = lower(i) | 2  *S = i.lower()* |
| 3  l = len(S) | 3  l = len(S) |
| 4  if(l%2!=0) | 4  if(l%2!=0): |
| 5     B = S[:(l+1)/2] | 5     *B = S[:(l+1)//2]* |
| 6     E = S[:(l+1)/2:-1] | 6     *E = S[:l//2-1:-1]* |
| 7     print(B,E) | 7     *#print(B,E)* |
| 8     if(B==E) | 8     if(B==E): |
| 9         print(i,'is a palindrome.') | 9         print(i,'is a palindrome.') |
| 10    else | 10    else: |
| 11        print(i,'is NOT a palindrome.') | 11        print(i,'is NOT a palindrome.') |
| 12 else | 12 else: |
| 13    B = S[:l/2] | 13    *B = S[:l//2]* |
| 14    E = S[:l/2:-1] | 14    *E = S[:l//2-1:-1]* |
| 15    print(B,E) | 15    *#print(B,E)* |
|  | 16    *if(B==E):* |
|  | 17        *print(i,'is a palindrome.')* |
|  | 18    *else:* |
|  | 19        *print(i,'is NOT a palindrome.')* |

Fig. 5

Algorithm 1 Chunker: slicing the program snippet that contains the error message

Input: *sC* : Program Source Code
Input: *msg* : Compiler Message
Output: *chunkedCode* : Chunked Program Source Code 1: procedure CHUNKER(*sC, msg*)
2:   *listsC, errorLine* = locateError(*sC, msg*)
3:   *indentLevel* = getIndentationLevel(*listsC, errorLine*)
4:   ▷ slice adjacent code with no less than the indentation level
5:   *start, end* = sliceBiway(*listsC, errorLine, indentLevel*)
6:   ▷ adjust slice pointers to account for containing control-flow
7:   if *listsC[start]*.startswith(cfNodes) then
8:     *newindentLevel* = getIndentationLevel(*listsC, start*)
9:     *start, end* = sliceBiway(*listsC, start, newindentLevel*)
10:  return *chunkedCode* = listsC[start, end]

Fig. 8

| SOME ASPECTS OF CODE IMPROVEMENT SYSTEMS 202 AND RELATED ITEMS ||||| 
|---|---|---|---|---|
| CANDIDATE 902 | SYNTAX ERROR 904 | SYNTAX PROMPT 906 | SEMANTIC PROMPT 908 DATASET 910 ||
| RESERVED WORD 912 | SEMANTIC ERROR 914 | EDIT DISTANCE 916 | INDENTATION 918 | CHUNK 920 |

Fig. 9

PROGRAM IMPROVEMENT USING LARGE LANGUAGE MODELS

BACKGROUND

Many modern devices in a broad range of fields have some form of computing power, and operate according to software instructions that execute using that computing power. A few of the many examples of devices whose behavior depends on software include cars, planes, ships and other vehicles, robotic manufacturing tools and other industrial systems, medical devices, cameras, inventory management and other retail or wholesale systems, smartphones, tablets, servers, workstations and other devices which connect to the Internet.

The firmware, operating systems, applications and other software programs which guide various behaviors of these and many other computing devices is developed by people who may be known as developers, programmers, engineers, or coders, for example, but are referred to collectively here as "developers". Developers interact with various kinds of software development functionality in source code editors, compilers, debuggers, profilers and other software development tools during software development.

Although many advances have been made, improvements in software development technologies remain possible, and are worth pursuing.

SUMMARY

Some embodiments described herein address technical challenges related to software development, such as how to identify and correct syntax errors, and how to fix semantic errors that result in incorrect program execution with respect to a test suite. For example, in some scenarios an embodiment repairs syntax errors and corrects semantic flaws in software source code, utilizing a large language model trained on code and multimodal prompts.

Other technical activities and characteristics pertinent to teachings herein will also become apparent to those of skill in the art. The examples given are merely illustrative. This Summary is not intended to identify key features or essential features of the claimed subject matter, nor is it intended to be used to limit the scope of the claimed subject matter. Rather, this Summary is provided to introduce—in a simplified form—some technical concepts that are further described below in the Detailed Description. The innovation is defined with claims as properly understood, and to the extent this Summary conflicts with the claims, the claims should prevail.

DESCRIPTION OF THE DRAWINGS

A more particular description will be given with reference to the attached drawings. These drawings only illustrate selected aspects and thus do not fully determine coverage or scope.

FIG. 4 is a first side-by-side pair of source code listings which illustrates incorrect code and automatically improved code;

FIG. 5 is a second side-by-side pair of source code listings which illustrates incorrect code and automatically improved code;

FIG. 8 is a pseudocode listing of a software code chunking algorithm;

FIG. 9 is block diagram illustrating some additional aspects of some software code improvement architectures;

DETAILED DESCRIPTION

Overview

Innovations may expand beyond their origins, but understanding an innovation's origins can help one more fully appreciate the innovation. In the present case, some teachings described herein were motivated by technical challenges arising from ongoing efforts by Microsoft innovators to improve the usability, efficiency, and power of software development tools.

Microsoft innovators noted that students make mistakes when learning to program. These mistakes can range from syntax to semantic errors. The innovators hypothesized that with the advent of large language models, such as the OpenAI Codex model, it would be possible to automatically fix such mistakes taking advantage of the richness of information in the education domain. The innovators created tools which produce repairs for both syntax and semantic errors, while reducing the number of changes with respect to the original incorrect program.

Some embodiments taught herein include both a syntactic phase code transformer and a semantic phase code transformer. The syntactic phase code transformer produces a version of a source code in which all syntax errors (if any) have been repaired. The semantic phase code transformer then produces a version of the source code in which all semantic errors (if any) have been mitigated. This permits a phased iterative approach, where an embodiment first fixes syntax and then fixes semantics, beneficially results in an overall higher fix rate than an approach which attempts to fix syntax and semantics in a single combined stage.

Some embodiments minimize a distance function, e.g., an edit distance, between automatically generated improved candidate versions and the flawed initial version of the source code. This beneficially improves developer understanding of the syntax and semantic flaws, and of the code that improves on them. This also promotes more efficient programming skills, particularly in students.

Some embodiments utilize alternate versions of the source code in few-shot learning by including examples (few-shots) in a prompt that are picked from submissions of a student's peers. This beneficially improves the fix rate.

These and other benefits will be apparent to one of skill from the teachings provided herein.

Operating Environments

Figure 1:
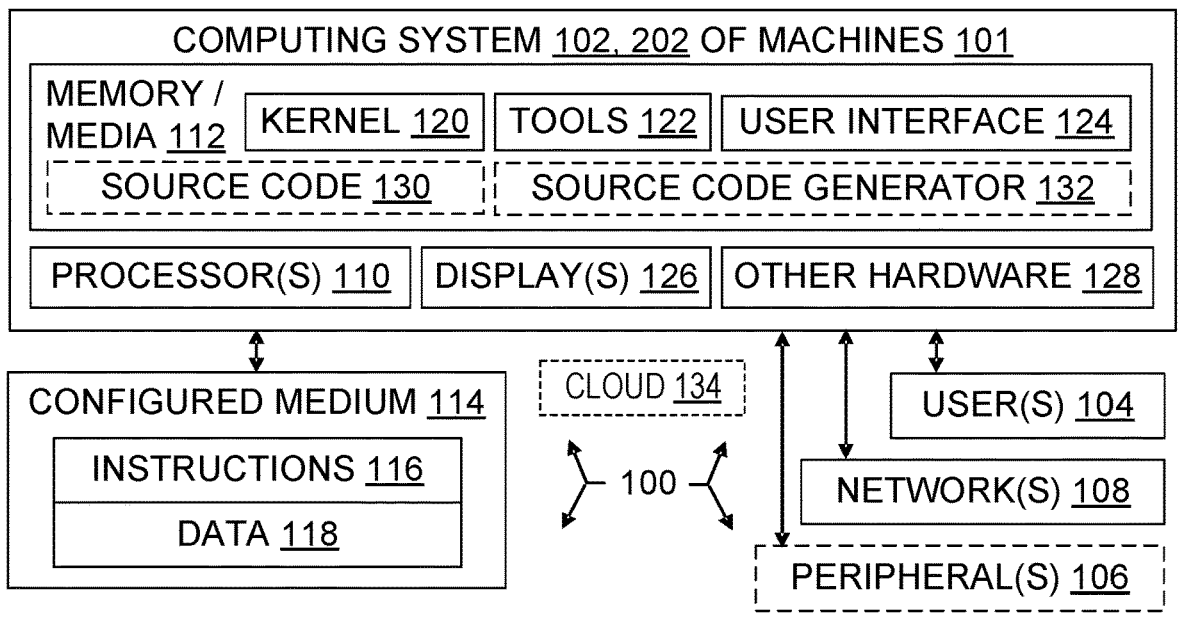
FIG. 1 is a diagram illustrating aspects of computer systems and also illustrating configured storage media, including some aspects and items which are generally suitable for systems that are enhanced to improve software source code automatically.
Figure 2:
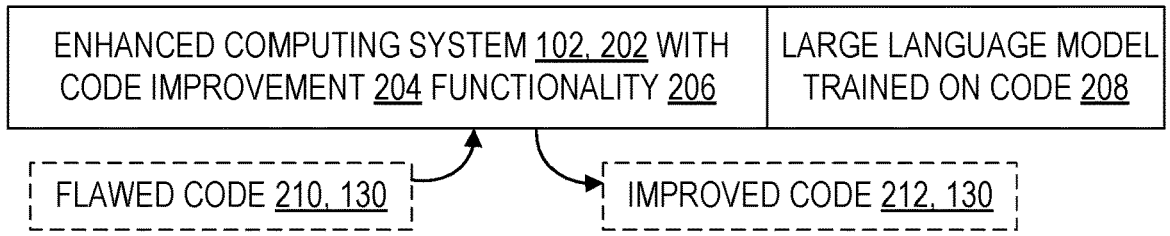
FIG. 2 is a diagram illustrating aspects of a computing environment and an enhanced system configured with software code improvement functionality which leverages a trained machine learning model.
Figure 3:
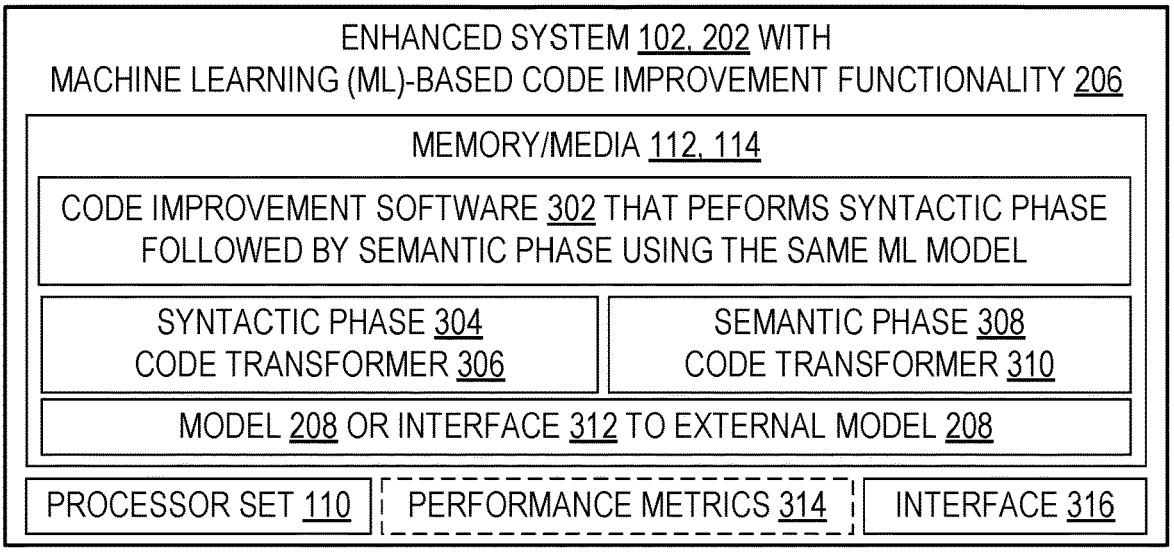
FIG. 3 is a block diagram further illustrating aspects of an enhanced system configured with machine learning-based software code improvement functionality.

With reference to FIG. 1, an operating environment 100 for an embodiment includes at least one computer system 102. The computer system 102 may be a multiprocessor computer system, or not. An operating environment may include one or more machines in a given computer system, which may be clustered, client-server networked, and/or peer-to-peer networked within a cloud 134. An individual machine is a computer system, and a network or other group of cooperating machines is also a computer system. A given computer system 102 may be configured for end-users, e.g., with applications, for administrators, as a server, as a distributed processing node, and/or in other ways.

Human users 104 sometimes interact with a computer system 102 user interface 124 by using displays 126, keyboards 106, and other peripherals 106, via typed text, touch, voice, movement, computer vision, gestures, and/or other forms of I/O. Virtual reality or augmented reality or both functionalities are provided by a system 102 in some embodiments. A screen 126 is a removable peripheral 106 in some embodiments and is an integral part of the system 102 in some embodiments. The user interface 124 supports interaction between an embodiment and one or more human users. In some embodiments, the user interface 124 includes one or more of: a command line interface, a graphical user interface (GUI), natural user interface (NUI), voice command interface, or other user interface (UI) presentations, presented as distinct options or integrated.

System administrators, network administrators, cloud administrators, security analysts and other security personnel, operations personnel, developers, testers, engineers, auditors, and end-users are each a particular type of human user 104. In some embodiments, automated agents, scripts, playback software, devices, and the like running or otherwise serving on behalf of one or more humans also have user accounts, e.g., service accounts. Sometimes a user account is created or otherwise provisioned as a human user account but in practice is used primarily or solely by one or more services; such an account is a de facto service account. Although a distinction could be made, "service account" and "machine-driven account" are used interchangeably herein with no limitation to any particular vendor.

Storage devices or networking devices or both are considered peripheral equipment in some embodiments and part of a system 102 in other embodiments, depending on their detachability from the processor 110. In some embodiments, other computer systems not shown in FIG. 1 interact in technological ways with the computer system 102 or with another system embodiment using one or more connections to a cloud 134 and/or other network 108 via network interface equipment, for example.

Each computer system 102 includes at least one processor 110. The computer system 102, like other suitable systems, also includes one or more computer-readable storage media 112, also referred to as computer-readable storage devices 112. In some embodiments, tools 122 include office productivity tools or software apps, on mobile devices 102 or workstations 102 or servers 102, as well as APIs, browsers, or webpages and the corresponding software for protocols such as HTTPS, for example. Files, APIs, endpoints, and other resources may be accessed by an account or set of accounts, user 104 or group of users 104, IP address or group of IP addresses, or other entity. Access attempts may present passwords, digital certificates, tokens or other types of authentication credentials.

Storage media 112 occurs in different physical types. Some examples of storage media 112 are volatile memory, nonvolatile memory, fixed in place media, removable media, magnetic media, optical media, solid-state media, and other types of physical durable storage media (as opposed to merely a propagated signal or mere energy). In particular, in some embodiments a configured storage medium 114 such as a portable (i.e., external) hard drive, CD, DVD, memory stick, or other removable nonvolatile memory medium becomes functionally a technological part of the computer system when inserted or otherwise installed, making its content accessible for interaction with and use by processor 110. The removable configured storage medium 114 is an example of a computer-readable storage medium 112. Some other examples of computer-readable storage media 112 include built-in RAM, ROM, hard disks, and other memory storage devices which are not readily removable by users 104. For compliance with current United States patent requirements, neither a computer-readable medium nor a computer-readable storage medium nor a computer-readable memory is a signal per se or mere energy under any claim pending or granted in the United States.

The storage device 114 is configured with binary instructions 116 that are executable by a processor 110; "executable" is used in a broad sense herein to include machine code, interpretable code, bytecode, and/or code that runs on a virtual machine, for example. The storage medium 114 is also configured with data 118 which is created, modified, referenced, and/or otherwise used for technical effect by execution of the instructions 116. The instructions 116 and the data 118 configure the memory or other storage medium 114 in which they reside; when that memory or other computer readable storage medium is a functional part of a given computer system, the instructions 116 and data 118 also configure that computer system. In some embodiments, a portion of the data 118 is representative of real-world items such as events manifested in the system 102 hardware, product characteristics, inventories, physical measurements, settings, images, readings, volumes, and so forth. Such data is also transformed by backup, restore, commits, aborts, reformatting, and/or other technical operations.

Although an embodiment is described as being implemented as software instructions executed by one or more processors in a computing device (e.g., general purpose computer, server, or cluster), such description is not meant to exhaust all possible embodiments. One of skill will understand that the same or similar functionality can also often be implemented, in whole or in part, directly in hardware logic, to provide the same or similar technical effects. Alternatively, or in addition to software implementation, the technical functionality described herein can be performed, at least in part, by one or more hardware logic components. For example, and without excluding other implementations, some embodiments include one of more of: hardware logic components 110, 128 such as Field-Programmable Gate Arrays (FPGAs), Application-Specific Integrated Circuits (ASICs), Application-Specific Standard Products (ASSPs), System-on-a-Chip components (SOCs), Complex Programmable Logic Devices (CPLDs), and similar components. In some embodiments, components are grouped into interacting functional modules based on their inputs, outputs, or their technical effects, for example.

In addition to processors 110 (e.g., CPUs, ALUs, FPUs, TPUs, GPUS, and/or quantum processors), memory/storage media 112, peripherals 106, and displays 126, some operating environments also include other hardware 128, such as batteries, buses, power supplies, wired and wireless network interface cards, for instance. The nouns "screen" and "display" are used interchangeably herein. In some embodiments, a display 126 includes one or more touch screens, screens responsive to input from a pen or tablet, or screens which operate solely for output. In some embodiments, peripherals 106 such as human user I/O devices (screen, keyboard, mouse, tablet, microphone, speaker, motion sensor, etc.) will be present in operable communication with one or more processors 110 and memory 112.

In some embodiments, the system includes multiple computers connected by a wired and/or wireless network 108. Networking interface equipment 128 can provide access to networks 108, using network components such as a packet-switched network interface card, a wireless transceiver, or a telephone network interface, for example, which are present in some computer systems. In some, virtualizations of networking interface equipment and other network components such as switches or routers or firewalls are also present, e.g., in a software-defined network or a sandboxed or other secure cloud computing environment. In some embodiments, one or more computers are partially or fully "air gapped" by reason of being disconnected or only intermittently connected to another networked device or remote cloud. In particular, code improvement functionality 206 could be installed on an air gapped network and then be updated periodically or on occasion using removable media 114, or not updated at all. Some embodiments also communicate technical data or technical instructions or both through direct memory access, removable or non-removable volatile or nonvolatile storage media, or other information storage-retrieval and/or transmission approaches.

One of skill will appreciate that the foregoing aspects and other aspects presented herein under "Operating Environments" form part of some embodiments. This document's headings are not intended to provide a strict classification of features into embodiment and non-embodiment feature sets.

One or more items are shown in outline form in the Figures, or listed inside parentheses, to emphasize that they are not necessarily part of the illustrated operating environment or all embodiments, but interoperate with items in an operating environment or some embodiments as discussed herein. It does not follow that any items which are not in outline or parenthetical form are necessarily required, in any Figure or any embodiment. In particular, FIG. 1 is provided for convenience; inclusion of an item in FIG. 1 does not imply that the item, or the described use of the item, was known prior to the current innovations.

In any later application that claims priority to the current application, reference numerals may be added to designate items disclosed in the current application. Such items may include, e.g., software, hardware, steps, methods, systems, functionalities, mechanisms, data structures, applications, entities, or other items in a computing environment, which are disclosed herein but not associated with a particular reference numeral herein. Corresponding drawings may also be added.

More About Systems

FIGS. 2, 3, 6, 7, 8, and 9 illustrate versions of a computing system 102 configured by one or more of the code improvement enhancements taught herein, resulting in an enhanced system 202. In some embodiments, this enhanced system 202 includes a single machine, a local network of machines, machines in a particular building, machines used by a particular entity, machines in a particular datacenter, machines in a particular cloud, or another computing environment 100 that is suitably enhanced. FIGS. 2, 3, 6, 7, 8, and 9 items are discussed at various points herein, and additional details regarding them are provided in the discussion of a List of Reference Numerals later in this disclosure document.

In some embodiments, the enhanced system 202 is networked through an interface. In some, an interface includes hardware such as network interface cards, software such as network stacks, APIs, or sockets, combination items such as network connections, or a combination thereof.

In some embodiments, a computing system 202 is configured to improve a source code 130. The system 202 includes a digital memory 112, and a processor set 110 in operable communication with the digital memory. The processor set 110 is configured to perform code improvement 204 operations. The system 202 includes: a model interface 312 to a large language machine learning model 208 trained on source codes; and at least one of: (i) a syntactic phase 304 code transformer 306 including a syntax checker 608, a program chunker 602, and a syntactic prompt generator 604, or (ii) a semantic phase 308 code transformer 310 including a semantic prompt generator 710 and a candidate validity tester 712.

Some embodiments herein utilize or include language models of various sizes, e.g., language models having at least one billion parameters, at least ten billion parameters, or at least one hundred billion parameters, or language models having less than one billion parameters, less than ten billion parameters, or less than one hundred billion parameters language. Some embodiments herein utilize or include language models trained on at least ten gigabytes of data, or at least one hundred gigabytes of data, or at least one terabyte of data, or language models trained on at most ten gigabytes of data, or at most one hundred gigabytes of data, or at most one terabyte of data. Models may be large models or edge models, and may be fine-tuned models or not fine-tuned, depending on the embodiment.

Upon execution of the syntactic phase code transformer 306 by the processor set, the syntax checker identifies 1112 a syntax error 904 in a first version 210 of a source code 210, 130, the program chunker extracts 1104 a code chunk 920 from the first version of the source code, the code chunk including the syntax error, the syntactic prompt generator receives 1114 the code chunk and produces 1116 a syntactic prompt 906 which contains at least the syntax error, and the model interface receives 1008 the syntactic prompt and produces 1010 at least a portion of the second version of the source code in which the syntax error has been repaired.

Upon execution of the semantic phase code transformer 310 by the processor set, the semantic prompt generator receives 1118 a semantic prompt dataset 910 which includes a syntactically correct version of the source code which contains a semantic error 914, the semantic prompt dataset also including a test suite 704, the semantic prompt generator produces 1006 multiple semantic prompts which permute the semantic prompt dataset, the model interface receives 1008 the semantic prompts and produces 1010 candidate versions of the source code, the candidate validity tester selects 1012 a candidate version which is syntactically correct and which also passes the test suite, and the semantic phase code transformer produces 1014 the selected candidate version which the system includes in the second version of the source code in which the semantic error has been mitigated.

In some embodiments, the dataset is permuted by an ensembler 606. For example, some permutations (ensembles) include: program 130, program plus diagnostics 610, program plus description 706, program plus diagnostics plus description, program plus diagnostics plus description plus tests 704, and program plus diagnostics plus tests.

Some embodiments include both the syntactic phase code transformer 306 and the semantic phase code transformer 310. In some they are configured to execute in order: syntactic phase 304 which then feeds into semantic phase 308.

In some embodiments which include the semantic phase code transformer, the second version 212 of the source code in which the semantic error has been mitigated 204 has improved performance over the syntactically correct version of the source code which contains a semantic error, the improved performance measured with respect to at least one of the following performance metrics 314: execution time, volatile memory usage, nonvolatile memory usage, bandwidth usage, or electric power consumption.

In some embodiments which include the semantic phase code transformer, the semantic prompt dataset 910 includes a task description 706 in a natural language.

Some embodiments include a source code generator 132, and at least one of the following is an output of the source code generator: the first version of the source code which is input to the syntactic phase code transformer, or the syntactically correct version of the source code which contains the semantic error and which is input to the semantic phase code transformer.

Other system embodiments are also described herein, either directly or derivable as system versions of described processes or configured media, duly informed by the extensive discussion herein of computing hardware.

Although specific code improvement 204 architecture examples are shown in the Figures, an embodiment may depart from those examples. For instance, items shown in different Figures may be included together in an embodiment, items shown in a Figure may be omitted, functionality shown in different items may be combined into fewer items or into a single item, items may be renamed, or items may be connected differently to one another.

Examples are provided in this disclosure to help illustrate aspects of the technology, but the examples given within this document do not describe all of the possible embodiments. A given embodiment may include additional or different kinds of machine learning models 208, for example, as well as different technical features, aspects, security controls, mechanisms, rules, criteria, expressions, hierarchies, operational sequences, data structures, environment or system characteristics, or other functionality 206 teachings noted herein, and may otherwise depart from the particular illustrative examples provided.

Processes (a.k.a. Methods)

Figure 10:
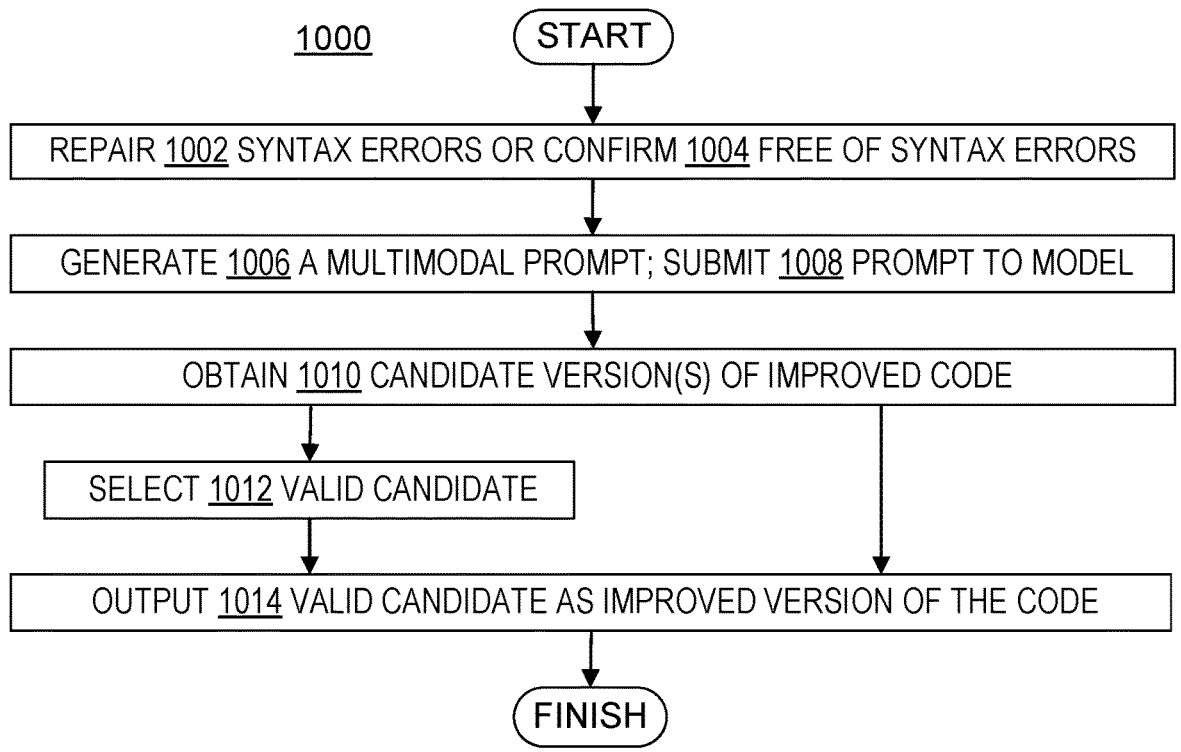
FIG. 10 is a flowchart illustrating steps in some software code improvement processes.
Figure 11:
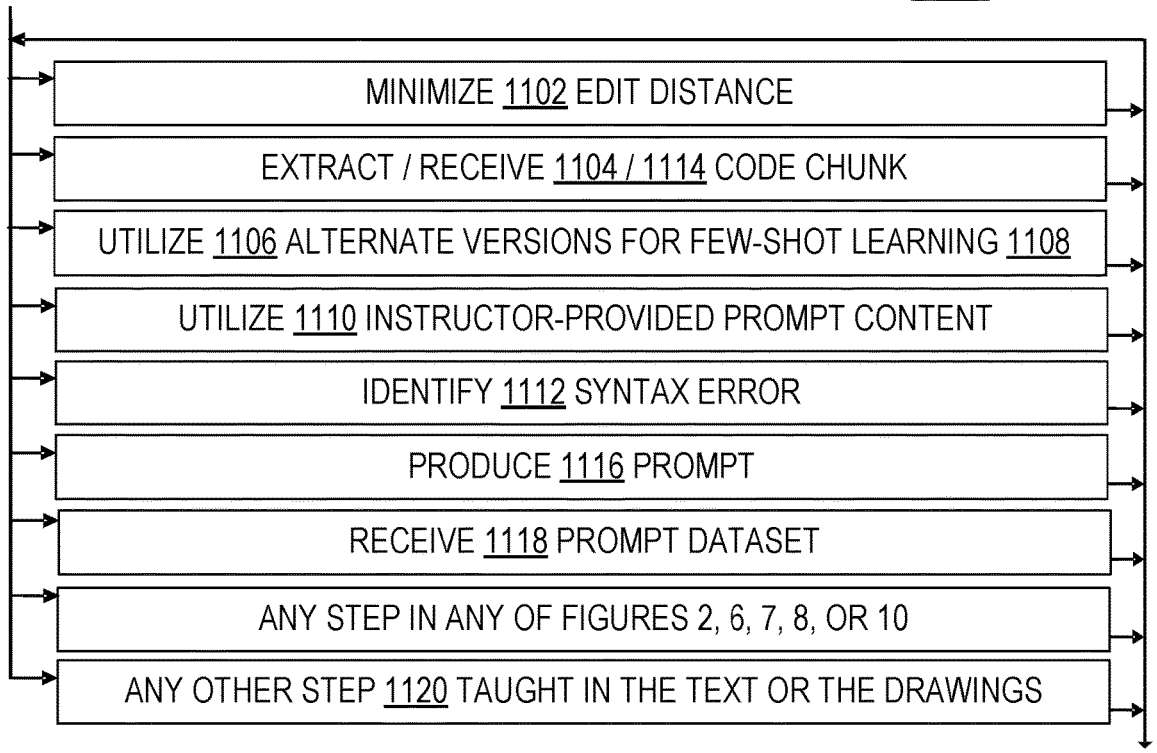
FIG. 11 is a flowchart further illustrating software code improvement processes, and incorporating FIG. 10.

Methods (which are also be referred to as "processes" in the legal sense of that word) are illustrated in various ways herein, both in text and in drawing figures. FIGS. 10 and 11 each illustrate a family of processes 1000, 1100 respectively, which are performed or assisted by some enhanced systems, such as some systems 202 or another functionality 206 enhanced system as taught herein. Process family 1000 is a proper subset of process family 1100. FIGS. 1 through 9 illustrate architectures with implicit or explicit actions, e.g., steps for reading, writing, or otherwise processing data 118, in which the data 118 include, e.g., source code 130, syntax error messages 610, task descriptions 706, test cases 704, and program chunks 920, among other examples disclosed herein.

Technical processes shown in the Figures or otherwise disclosed will be performed automatically, e.g., by an enhanced system 202, unless otherwise indicated. Related non-claimed processes may also be performed in part automatically and in part manually to the extent action by a human person is implicated, e.g., in some embodiments a human 104 types in a flawed source code 210 for the system 202 to improve. But no process contemplated as innovative herein is entirely manual or purely mental; none of the claimed processes can be performed solely in a human mind or on paper. Any claim interpretation to the contrary is squarely at odds with the present disclosure.

In a given embodiment zero or more illustrated steps of a process may be repeated, perhaps with different parameters or data to operate on. Steps in an embodiment may also be done in a different order than the top-to-bottom order that is laid out in FIG. 11. FIG. 11 is a supplement to the textual examples of embodiments provided herein and the textual descriptions of embodiments provided herein. In the event of any alleged inconsistency, lack of clarity, or excessive breadth due to an aspect or interpretation of FIG. 11, the text of this disclosure shall prevail over that aspect or interpretation of FIG. 11. Arrows in method or data flow figures indicate allowable flows; arrows pointing in more than one direction thus indicate that flow may proceed in more than one direction. Steps may be performed serially, in a partially overlapping manner, or fully in parallel within a given flow. In particular, the order in which flowchart 1100 action items are traversed to indicate the steps performed during a process may vary from one performance of the process to another performance of the process. The flowchart traversal order may also vary from one process embodiment to another process embodiment. Steps may also be omitted, combined, renamed, regrouped, be performed on one or more machines, or otherwise depart from the illustrated flow, provided that the process performed is operable and conforms to at least one claim of an application or patent that includes or claims priority to the present disclosure. To the extent that a person of skill considers a given sequence S of steps which is consistent with FIG. 11 to be non-operable, the sequence S is not within the scope of any claim. Any assertion otherwise is contrary to the present disclosure.

Some embodiments provide or utilize a process to improve a first version of a source code, the process performed (executed) by a computing system 202, the process including: repairing 1002 any syntax errors in the first version of the source code or confirming 1004 that the first version of the source code is free of syntax errors, or both, thereby yielding a syntactically correct version of the source code; generating 1006 a multimodal prompt which includes at least two of the following: a chunk 920 or other portion of the syntactically correct version of the source code, a natural language description 706 of a task to be accomplished by any improved version of the source code, or a test case 704 to be satisfied by the improved version of the source code; submitting 1008 the multimodal prompt to a large language machine learning model trained on source codes (LLMC) 208; obtaining 1010 candidate versions of the improved version of the source code from the LLMC; selecting 1012 a valid candidate version of the improved version of the source code from among the candidate versions; and outputting 1014 the selected valid candidate version.

In some embodiments, the multimodal prompt includes: the portion of the syntactically correct version of the source code, and the natural language description of the task to be accomplished by any improved version of the source code.

In some embodiments, the multimodal prompt includes: the portion of the syntactically correct version of the source code, and the test case to be satisfied by the improved version of the source code.

In some embodiments, the multimodal prompt includes: the portion of the syntactically correct version of the source code, the natural language description of the task to be accomplished by any improved version of the source code, and the test case to be satisfied by the improved version of the source code.

In some embodiments, selecting 1012 the valid candidate version of the improved version of the source code from among the candidate versions includes minimizing 1102 an edit distance 916 between the candidate versions and the first version of the source code.

In some embodiments, the process includes repairing 1002 a syntax error in the first version of the source code, and the repairing includes: generating a syntactic prompt which includes the syntax error, submitting the syntactic prompt to the LLMC, and getting a syntax error correction from the LLMC. In some, generating the syntactic prompt includes extracting 1104 a code chunk of the first version of the source code, and the extracting is based on a location of the syntax error and also based on at least one of the following: a programming language reserved word 912 location in the first version of the source code, or a formatting indentation 918 in the first version of the source code.

In some embodiments, the process includes utilizing 1106 alternate versions of the source code in few-shot learning 1108 by the LLMC.

In some embodiments, the process is suitable for improving programs written by students in at least one of the following ways: the first version of the source code and the selected valid candidate version are each no longer than fifty lines; an instructor-provided alternative to the selected valid candidate version is included in a prompt to the LLMC; an instructor-provided natural language description of the task to be accomplished by any improved version of the source code is included in a prompt to the LLMC; or an instructor-provided edge test case is included in a prompt to the LLMC.

Configured Storage Media

Some embodiments include a configured computer-readable storage medium 112. Some examples of storage medium 112 include disks (magnetic, optical, or otherwise), RAM, EEPROMS or other ROMs, and other configurable memory, including in particular computer-readable storage media (which are not mere propagated signals). In some embodiments, the storage medium which is configured is in particular a removable storage medium 114 such as a CD, DVD, or flash memory. A general-purpose memory, which is be removable or not, and is volatile or not, depending on the embodiment, can be configured in the embodiment using items such as source code versions 130, 210, 212, 702, test cases 704, task descriptions 706, code transformers 306, 310, machine learning models 208, and prompt generators 604, 710, in the form of data 118 and instructions 116, read from a removable storage medium 114 and/or another source such as a network connection, to form a configured storage medium. The configured storage medium 112 is capable of causing a computer system 202 to perform technical process steps for code improvement, as disclosed herein. The Figures thus help illustrate configured storage media embodiments and process (a.k.a. method) embodiments, as well as system and process embodiments. In particular, any of the process steps illustrated in FIG. 10 or 11 or otherwise taught herein may be used to help configure a storage medium to form a configured storage medium embodiment.

Some embodiments use or provide a computer-readable storage device 112, 114 configured with data 118 and instructions 116 which upon execution by a processor 110 cause a computing system to perform a source code improvement process to improve a first version of a source code, the process performed by a computing system 202 in a cloud computing environment 134, 100 or in another computing environment 100, or both. This process includes: repairing 1002 any syntax errors in the first version of the source code or confirming 1004 that the first version of the source code is free of syntax errors, or both, thereby yielding a syntactically correct version of the source code; submitting 1008 a multimodal prompt to a large language machine learning model trained on source codes (LLMC); receiving 1010 candidate versions of the improved version of the source code from the LLMC; selecting 1012 a valid candidate version of the improved version of the source code from among the candidate versions; and outputting 1014 the selected valid candidate version.

In some embodiments, the process includes repairing 1002 any syntax errors in the first version of the source code, and the repairing includes submitting to the LLMC a first syntactic prompt which contains the syntax error and submitting to the LLMC a second syntactic prompt which does not contain the syntax error, and getting a syntax error correction from the LLMC in response to at least the first syntactic prompt and the second syntactic prompt.

In some embodiments, the process includes repairing 1002 any syntax errors in the first version of the source code, the repairing includes submitting to the LLMC a code chunk, and the code chunk includes a control-flow statement 130 which encompasses the syntax error.

In some embodiments, the process is suitable for improving programs written by students in at least one of the following ways: an instructor-provided alternative to the selected valid candidate version is included 1110 in a prompt to the LLMC; an instructor-provided natural language description of the task to be accomplished by any improved version of the source code is included 1110 in a prompt to the LLMC; or an instructor-provided edge test case is included 1110 in a prompt to the LLMC.

In some embodiments, the process includes prompting the LLMC with a syntactic prompt, utilizing an LLMC response to the syntactic prompt to repair a syntax error in the first version of the source code, then prompting the LLMC with a semantic prompt, and including an LLMC response to the semantic prompt in the selected valid candidate version.

In some embodiments, the process includes training the LLMC by few-shot learning.

Additional Observations

Additional support for the discussion of code improvement functionality 206 herein is provided under various headings. However, it is all intended to be understood as an integrated and integral part of the present disclosure's discussion of the contemplated embodiments.

One of skill will recognize that not every part of this disclosure, or any particular details therein, are necessarily required to satisfy legal criteria such as enablement, written description, or best mode. Any apparent conflict with any other patent disclosure, even from the owner of the present innovations, has no role in interpreting the claims presented in this patent disclosure. With this understanding, which pertains to all parts of the present disclosure, examples and observations are offered herein.

In some embodiments, a software development process of repairing software includes: obtaining a source code; formulating a series of prompts based on at least the source code; submitting the prompts to a large language machine learning model; receiving responses from the model; and correcting errors or omissions in the source code based on the responses. Some embodiments include fine-tuning the model by training it further of specific examples relevant to the task, and then submitting, receiving, and correcting with the fin-tuned model and its responses.

Although student programming is a motivational context for innovations described herein, the present teachings may also be beneficially applied in other contexts, e.g., to improve code 130 output by source generator software 132.

Some embodiments automatically fix semantic and syntax bugs in students' programming, e.g., using a large model similar to the OpenAI Codex model, trained with source code.

As a motivational context, students make a lot of mistakes when programming. Sometimes students can't even make their program run. Automated program repair may help, but different approaches are possible. One approach involves engineering an expensive system. This is less flexible, likely more expensive, and not necessarily more accurate, than the approaches taught herein.

Some approaches taught herein use neural models, which are trained on incorrect student feedback. In some, an off-the-shelf large language model is used to address mistakes students make. Unlike some other software development contexts, a student programming context includes information about what students are supposed to do, such as teacher instructions 706. In addition, students have peers trying to write the same kind of program, so peer programs 702 are available as prompts or for training data. Furthermore, a student programming context often includes a test suite 704 which the students' programs must pass.

Some approaches taught herein use multimodal prompts that are also ensembled, and choose the best one. Different information is provided in each portion of the process. Some embodiments create different prompts with different information and then pick the best, e.g., per a parser, per instructor test cases, per edit distance, or per a combination of such criteria.

Some approaches separate a code improvement process into syntax repair followed by semantics repair. Different prompts are submitted to the model 208 in each phase, but the underlying engine 208 is the same.

In a student programming context, teaching result are better when the corrected code 212 is close to what 210 the student wrote. Some embodiments make as few changes 1102 as necessary. Toward this end, some localize 1104 prompt content to where the program has syntax errors.

In some embodiments, a syntax phase takes in a student's program that has syntax and semantic errors, and forms chunks and prompts. Other inputs may include compiler or interpreter error messages, or a description of the task, or both. For each prompt, the embodiment queries the model 208. Software 302 replaces the chunk with the completion that the model suggested. If that satisfies the parser 608, the process proceeds to the semantic phase. In the semantics phase, some embodiments include other peers work 702 in prompts. Peer wrong submissions and peer correct submissions are processed and added to prompts to be submitted.

Many automated program repair tools focus on either syntax or semantics separately. Tools that focus on the former often do not fix any correctness issues beyond syntax, meaning, there is no functional correctness. Tools that focus on the latter often assume the program is syntactically correct and then try to fix any functional correctness issues. Some embodiments taught herein combine both into a single system that is powered by a large language model 208.

Some embodiments take advantage of the information available in the educational domain. In particular, some combine or embody one or more of the following insights. First, a tool 302 can construct prompts of varying performance by including different signals, such as language diagnostics, tooling diagnostics, natural language description of the intended task, input/output-based test cases, a student's incorrect program, and programs from the student's peers. Second, these prompts can be complementary, so that rather than pick a single approach, the tool 302 can combine them in an ensemble of prompts that results in better fix rates. Third, an iterative querying approach, which first tries to fix syntax and then tries in a second stage fix semantics, results in an overall higher fix rate. Fourth, by including examples (few-shots) in the prompt picked from the student's peers' submissions 702, the tool 302 can improve the fix rate further. To pick these few shots, the tool 302 relies on a similarity metric over test-case executions (e.g., similar failures, may reflect similar mistakes that can then inform the prompt). Finally, a tool 302 can reduce the size of the edit generated by the model 208 by localizing syntactic faults to a sub-portion of the student's program, including only that portion 920 in a query to the model 208, and then merging the results back into the original student submission 210.

The definition of semantic bugs herein also includes performance flaws when the test suite specifies a program's output not merely in terms of data produced by the program but also in terms of data produced by monitoring the program's performance. Thus, an example of a semantic bug to be repaired is performance that can be improved, e.g., in terms of execution time or memory usage. As an example, a first test that does not include performance as semantics would specify that a program should produce only even numbers; if a candidate program produces an odd number as output, the candidate program fails the first test. By contrast, a second test specifies that the program produce only even numbers and that the program finish within ten seconds of wall clock time and that the program run with not more than three megabytes of RAM. If a candidate program produces only even numbers and finishes in seven seconds of wall clock time but consumes four megabytes of RAM, then the candidate program fails the second test.

Some embodiments share characteristics with MMAPR, a multimodal automated repair system 202. MMAPR is a unified syntax and semantic repair engine for introductory Python® programming assignments (mark of the Python Software Foundation). A large language model trained on code (LLMC) is a core component in some embodiments of MMAPR 202. Using an LLMC removes the need for custom symbolic repair logic or retraining of a new neural model, and it allows MMAPR to handle both syntactic and semantic mistakes. However, a large language model trained on plain text, not code, is also used in some embodiments.

Program repair may be framed as a code generation task that can be tackled with an LLMC. However, using LLMCs to produce student repairs poses challenges. First, in the classroom setting, multiple sources can help to repair students' code so a challenge arises as to which sources to use, and how to use them. For example, the instructor might provide test cases that the solution code needs to pass, and/or a description of the task in a natural language. Even the compiler messages can be used to repair syntax errors in the code. While standard LLMC-based automatic program repair (APR) tools take as input the buggy code and only one correctness criterion (for example, test cases), an approach taught herein is multimodal. In addition to the student's buggy program, MMAPR can also take all the above-mentioned sources as a part of the input. Moreover, MMAPR makes effective use of other students' submissions, if they are available. Second, it is a challenge to mitigate the extent to which the LLMC can generate more code than necessary or make changes to parts of the program that are not incorrect, which could result in an excessive patch, or even an incorrect patch. Third, using an LLMC as a black box also poses the challenge of adapting traditional prompt engineering techniques. Some embodiments use prompt-based learning to generate the code. MMAPR ensembles multimodal prompts to generate complementary repair candidates. It employs prompts in an iterative querying strategy that first uses syntax-targeted prompts and then semantics-targeted prompts. MMAPR leverages few-shot learning, which adds task-related examples to the prompt, by retrieving other student's programs that have similar mistakes (and eventual corrections). To identify these programs, MMAPR computes a similarity metric over test-suite outcomes. Finally, to reduce the number of changes induced by syntax errors that should have relatively simple fixes, MMAPR uses the program's structure to extract a subprogram to give as input to the LLMC. By reducing the code surface exposed to the LLMC, MMAPR biases repairs towards fewer edits.

An implementation of MMAPR was evaluated on student programs, from an introductory Python® programming course at a major university in India. The evaluation has 15 programming tasks, totaling 286 student programs. These student programs contain both syntactic and semantic mistakes. As there was no tool that can solve both errors simultaneously, the evaluation approach combined Break-it-fix-it (BIFI) with Refactory to create a baseline system. BIFI is a transformer-based syntax repair engine for Python®, while Refactory is a symbolic semantic repair engine for introductory Python® assignments. Evaluation results show that MMAPR can effectively repair student programs in the benchmark set. While the baseline repairs 67.13% of programs, MMAPR (without few-shot learning) can repair 86.71%. Adding few-shot learning to MMAPR increases this repair rate to 96.5%. Furthermore, the average token edit distance associated with MMAPR patches are smaller (31.4 without few-shots and 31.29 with few-shots) compared to the patches produced by the baseline (42.50). Ablation study results indicate that by performing iterative querying the repair rate rises from 82.87% to 86.71%. Furthermore, adding few-shots raises the repair success rate to 96.5%. The evaluation also shows that removing the program chunker, which selects subprograms in the syntax repair phase, raises the average token edit distance from 5.46 to 9.38. Evaluation also shows that different multimodal prompts have varying performance, but the best performance is obtained by combining candidates as in MMAPR.

Some embodiments automatically repair mistakes in students' programming assignments using a large language model trained on code (LLMC). Some embodiments use multimodal prompts, iterative querying, test-case-based few-shot selection, and structure-based program chunking to repair student mistakes. Some use the same underlying LLMC to repair both syntactic and semantic mistakes.

Consider FIG. 4, which shows a student's incorrect program, along with a solution generated by MMAPR. The student is solving the task of reading two numbers from stdin and printing different things depending on whether both, either, or neither of the values are prime.

In FIG. 4, the student's submission contains both syntax and semantic mistakes (shown in bold). MMAPR fixes (shown in bold italics) the original semantic and syntactic issues and also refactors part of the student's code into a function (lines 8-17 in (b)) that avoids code duplication (lines 9-17, 18-26 in (a)).

The student has made both syntactic and semantic mistakes. Lines 1 and 2 call input twice to read from stdin, and parse these values as integers using int. However, this constitutes a semantic mistake, as the assignment input format consists of two values on the same line separated by a comma. Furthermore, a traditional semantic repair engine would fail to fix this student's assignment as there is also a syntactic mistake at line 30. The student used a single=for comparison in the elif clause (the correct syntax would be a double equals).

The MMAPR solution, shown alongside, fixes the input processing (semantic mistake) by reading from stdin, splitting on the comma, and applying int (to parse as integer) using the map combinator. Line 23 fixes the syntax error by replacing single equals with double equals (for comparison). Interestingly, the underlying LLMC (Codex) also refactored the student's program. In this case, lines 8 through 17 correspond to a function to check if a number is prime. This function is called twice, at lines 18 and 19. This replaces the repeated code in the original program, which spanned lines 9-17 and lines 17-26.

The edit distance between the MMAPR repair and the original student program is 95, while the distance between the instructor's reference solution and the original student program is 188. A smaller edit distance is a goal for APR in the educational domain, as this can help the student understand the repair with respect to their own mistakes.

FIG. 5 presents another example of an incorrect student program and a solution generated by MMAPR. In this assignment, the students are told to check whether a string, read from stdin, is a palindrome or not, and print out a message accordingly to stdout. For this student's program, MMAPR generates a complex repair that fixes four syntax mistakes and multiple semantic bugs.

In FIG. 5, a complex repair (shown in bold italics) fixes multiple syntax and semantic mistakes (shown in bold). The repair produced by MMAPR, which preserves the overall structure of the student's program, makes fewer changes to the student's program than a patch with respect to the instructor's reference solution.

The student has made syntax errors on lines 4, 8, 10, and 12, where they have left off the colon symbol necessary for control flow statements in Python. On line 2, the student called a non-existent function lower. The student has used standard division on lines 5, 6, 13, and 14 when they should have used integer division. The student has included two spurious print statements, at lines 7 and 15, which will interfere with the instructor's test-suite execution, as the suite checks values printed to stdout for correctness. Finally, the student has omitted the expected print statements (along with the equality check) for the case where the input string is of even length.

While the student's program has many mistakes, the overall structure and key concepts are there. Looking at the MMAPR solution shown alongside, it resolves these mistakes but preserves the student's overall structure. In particular, MMAPR replaces the non-existent lower function with a call to the string method with the same name. It replaces the division operator (/) throughout the program with the intended floor division operator (//), comments out the extra print statements, and adds the missing equality check and print statements in the case of even-length inputs.

The edit distance between the MMAPR repair and the original student program is 52, while the distance between the instructor's reference solution and the original student program is 97. The reference solution is a standard one line program for palindrome. Once again, the MMAPR repair is closer to the student submission than the instructor's reference solution.

A large language model (LLM) can be viewed as a probability distribution over sequences of words. This distribution is learned using a deep neural network with a large number of parameters. These networks are often trained on large amounts of text (or code) with objectives such as predicting particular masked-out tokens or autoregressive objectives such as predicting the next token given the preceding tokens. When the LLM has been trained on significant amounts of code, it is called a large language model trained on code (LLMC).

Often, LLMs are pre-trained and then fine-tuned, meaning trained further on more specialized data or tasks. A particularly popular LLMC is OpenAI's Codex, a variant of GPT-3 that is fine-tuned on code from more than 50 million GitHub® repositories (mark of GitHub, Inc.). In contrast to traditional supervised machine learning, LLMs have shown to be effective for few- and even zero-shot learning. This means that the LLM can perform tasks it was not explicitly trained for just by giving it a few examples of the task or even no examples, respectively, at inference time. In this setting of few- or zero-shot learning, the LLM is sometimes employed using what is termed prompt-based learning. A prompt is a textual description of a task to be performed, that is given as input to the LLM to obtain a sequence of iteratively predicted next tokens, called a generation. A prompt often consists of a query and possibly zero or more examples of the task, called shots. For example, the prompt below includes a specific query to fix a syntax error. One valid generation, that fixes the syntax error, would be print( )

Fix the syntax error of the program #
Buggy program #
print("\")

In practice, a prompt can incorporate anything that can be captured in textual format. In particular, multimodal prompts are those that incorporate different modalities of inputs, such as natural language, code, and data. Different prompts may result in different LLM completions. Other factors may also affect the completions produced, such as the sampling strategy or hyperparameters for the sampling strategy. One hyperparameter is temperature, which controls the extent to which an approach samples less likely completions.

Although some embodiments taught herein communicate with OpenAI's Codex in this work, there are also other LLMs that could be used such, as Salesforce's CodeGen or OpenScience's BLOOM. Even within OpenAI's Codex there are different underlying models offered, including Codex-Edit. Experimentation found performance to be better with the standard Codex completion model. Some embodiments leverage these concepts in an approach to APR.

Figure 6:
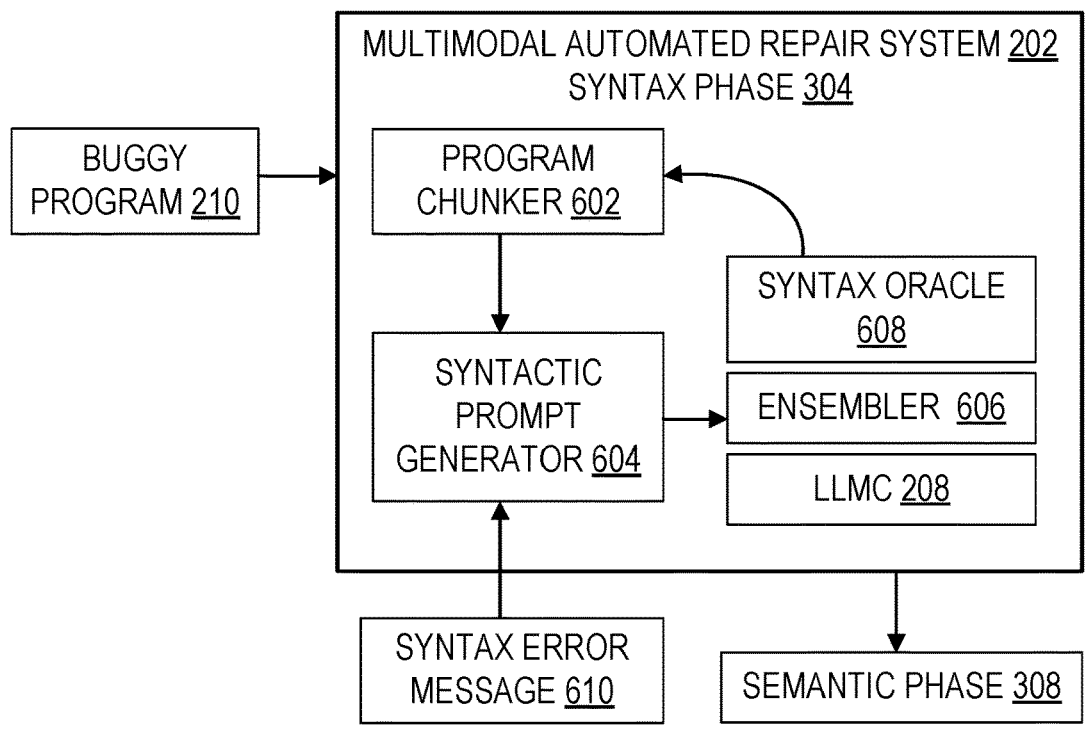
FIG. 6 is data flow architecture diagram illustrating a syntax phase of a multimodal automated software code improvement system.
Figure 7:
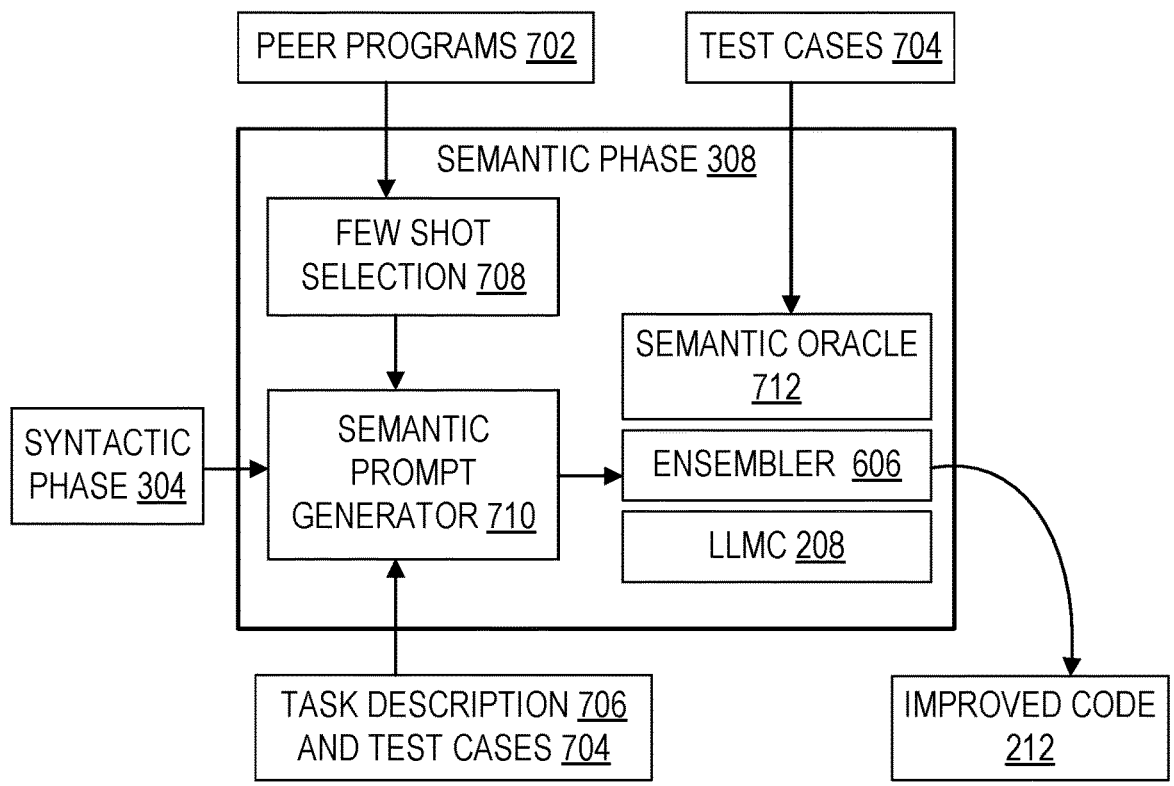
FIG. 7 is data flow architecture diagram illustrating a semantic phase of the multimodal automated software code improvement system of FIG. 6.

FIGS. 6 and 7 provide an overview of the architecture underlying MMAPR. A buggy program first enters a syntax repair phase. In this phase, MMAPR transforms the program using a program chunker, which performs a structure-based subsetting of code lines to narrow the focus for the LLMC. Multiple syntax-oriented prompts are generated using this subprogram, fed to an LLMC, and any patches are integrated into the original program. If any candidate satisfies the syntax oracle, it can move on to the semantic phase. In the semantic phase, MMAPR leverages both the natural language description of the assignment and the instructor-provided test cases to create various prompts. In addition, if available, MMAPR can use other peers' solutions as few-shots by selecting them using test-case-based selection to identify failures that resemble the current student's program, along with eventually correct solutions. Prompts are fed to the LLMC to generate candidates. If multiple candidates satisfy the test suite, MMAPR returns the one with the smallest edit distance with respect to the original student program.

As shown in FIG. 6, the student's buggy program first enters a syntax repair phase 304. In this phase, MMAPR extracts subprograms from the original program that have a syntax error. Each such subprogram is fed to a syntax prompt generator that produces multiple syntax-oriented prompts. The LLMC then generates repair candidates, which are validated by the syntax oracle. This process is repeated until all syntax errors are removed. Any candidate that has no syntax errors moves on to the semantic phase 308.

In this phase 308, MMAPR uses a semantic prompt generator to produce semantics-oriented prompts. If it has access to other student's assignment history, MMAPR can also add few-shots 702 to these prompts. These prompts are fed to the LLMC, which generates new program candidates. These are validated by the test-suite-based semantic oracle. If multiple candidates satisfy all test cases, MMAPR returns the one with the smallest token edit distance with respect to the student's original buggy program.

Now consider this example in greater detail, beginning with the Syntax Phase 304. Students often first resolve syntax errors in their assignments, and then move on to resolve semantic errors (such as test case failures). MMAPR splits its repair into syntax and semantic phases. In the first phase 304, MMAPR receives the student's buggy program. A syntax oracle 608, for example, the underlying Python or other programming language parser, is used to determine if there is a syntactic mistake. If there is no such mistake, the program can move into the semantic phase. However, if there is a mistake, MMAPR will produce a patch that resolves it, before moving to the semantic phase.

While the syntax prompt generator could directly include the original program in the prompt, doing so can result in spurious edits that are not actually necessary to resolve the syntax error. Thus, a program chunker addresses this challenge by reducing the amount of code included in the prompt.

For each syntax mistake in the original buggy program, the program chunker extracts a subset of lines that contains (1) the oracle-reported syntax error location and (2) the nearest encompassing control-flow statement. These chunks are a heuristic approximation of a basic block, and help restrict the code input given to the LLMC. This heuristic approximation, when performed as an analysis to extract basic blocks, often presumes a syntactically correct input program. MMAPR extracts the program chunk for the first (top-down) syntax error reported.

Algorithm 1 in FIG. 8 outlines the procedure used to produce this program chunk. It takes advantage of both control-flow structure (based on Python keywords 912) and indentation 918, which is meaningful in the Python language. The program chunker first identifies the adjacent code that has the same or large indentation level as the line with the syntax error. Then, if the code chunk contains control flow related keywords, such as if and elif, MMAPR makes sure the corresponding keywords (such as elif or else) is also in the chunk. This program chunk is then provided to the syntax prompt generator.

The syntax prompt generator produces two (multimodal) prompts, one with and one without the syntax error message reported by the syntax oracle. An example of both is shown below, with portions of the code fragments elided for brevity.

(a) without error message

```
# Buggy Program #
while (n > 0):
a = n % 10
...
(b) with error message
Error Msg ###
File "<unknown >",line 2
a = n % 10
^
IndentationError:
expected an
indented block
# Buggy Program #
while (n > 0):
a = n % 10
...
```

Because the syntax oracle is available, MMAPR need not to choose a single prompt template for all programs, but instead can query the LLMC with both prompts, extract the code portion from each generation, merge it into the original program by replacing the lines corresponding to the current program chunk, and then rely on the syntax oracle to filter out invalid repairs.

If a program candidate has no syntax errors, it can move on to the semantic phase. If any syntax errors remain, the syntax phase is repeated on this candidate program. This iteration allows the repair of multiple, spatially-independent, syntax errors. In the evaluation, this procedure iterated at most two times, to limit repair times.

After MMAPR has generated syntactically valid candidate programs, the repair procedure moves to a semantic repair phase. Intuitively, this phase incorporates information that allows the LLMC to generate candidate programs that satisfy the programming assignment task, as determined by a semantic oracle 712. Some embodiments use the instructor's test suite (consisting of inputs and expected outputs) as the semantic oracle. A program has been repaired if it produces the expected outputs for the given inputs.

The semantic prompt generator takes advantage of the rich set of signals available in the education domain. In particular, student programming assignments often have available: (1) a natural language description of the task, (2) a set of test cases, and (3) peers' programming solutions. In some cases, the semantic prompt generator takes as input a syntactically valid program, the task description in natural language, and the set of instructor-provided test cases. The generator then produces prompts with different combinations of this information. An example of such a multimodal prompt is shown below. This prompt includes the student's buggy code, the natural language description of the assignment, as well as the input-output-based test cases.

```
[[Buggy Program]]
Buggy Program ###
```

-continued

```
x=input( )
y=int(x)
z = number % 10
y = 10 * y + z
number = number / 10
number = int(number)
print("Reverse: { }".format(x[::-1]))
print("Sum: { }".format(Sum))
[[Problem Description]]
#Write a program to read a number (int) from the
user. Print the number in reverse. Also print
the sum of the number and its reverse in a
separate line. See the examples.
#NOTE: Do not print any prompt in the input( ).
[[Test Suite]]
#input:
43
#output:
Reverse: 34
Sum: 77
#input:
500
#output:
Reverse: 5
Sum: 505
Correct Program ###
```

This example multimodal prompt, shown in a zero-shot setting for brevity, is produced by the semantic prompt generator. This prompt includes code, natural language, and test cases. Lines starting with the double brackets are shown only for clarity.

If MMAPR has access to other students' assignment solution history, then it can also employ few-shot learning, in each of these prompts. Similar to the syntax phase, rather than picking a single prompt template, some embodiments use all prompts generated and rely on the semantic oracle to identify viable repair candidates. Each prompt given to the LLMC can generate up to K candidates, where some embodiments heuristically set K to ten to balance exploration of candidates with search space explosion. Each of these candidates is given to the semantic oracle, which executes that candidate on the test suite. The embodiment removes any candidate programs that result in a runtime exception or fail to satisfy any test cases. If there are multiple valid candidate programs after the semantic phase, some embodiments return the one with the smallest token-based edit distance to the student as the repaired program.

As to few-shot learning, if MMAPR has access to other students' programs it can employ few-shot learning. In some cases, MMAPR's few-shots consist of both correct and incorrect programs. In particular, MMAPR's few-shot learning example bank includes or consists of pairs of program versions (p; p0) where both p and p0 satisfy the syntax oracle, p0 satisfies the semantic oracle but p does not, and p is a historical edit-version ancestor of p0. Given a candidate program produced by the syntax phase, some embodiments retrieve the three most similar p and their associated correct versions p0 to include as shots in the LLMC prompts produced by the semantic prompt generator. Two programs are similar if they result in similar test suite executions. A test suite execution vector for program p that captures test failures is defined as $Tp \in B^n = (t0; \_\_; tn)$ where n is the number of test cases, and ti is the boolean failure status of the ith test. A similarity function between p1 and p2 is defined as 1—HAMMING(Tp1; Tp2) with HAMMING being the normalized Hamming distance between the two vectors.

If MMAPR does not have access to peer programs, then it can still query the LLMC using a zero-shot approach.

Shown below is an illustrative buggy student program, along with a single shot, consisting of the incorrect and corrected program from a peer. The shot picked has the same test execution vector as the target buggy program.

```
[[Shot Starts]]
# Incorrect Program #
print (m+n)
# Correct Program #
print (m*n)
[Shot Ends]
[[Buggy Program Starts]]
Buggy Program ###
sum = m
i = 0
while i < n:
sum += 1
i += 1
print (sum)
[[Buggy Program Ends]]
[[Test Suite Starts]]
#input:
2 2
#output:
4
#input:
2 3
#output:
6
[[Test Suite Ends]]
Correct Program ###
```

As an evaluation implementation, a MMAPR prototype was built using a mix of Python and open-source software libraries. The core of this MMAPR implementation consists of approximately 600 lines of Python code, which is 5 to 10 times less than some symbolic repair systems in the education domain. In addition to the reduced engineering efforts, MMAPR can handle both syntax and semantic bugs in one system, while many systems focus on one or the other of the two bug classes. Evaluation selected the top 10 program candidates in each syntax and semantics phase based on the on the average token log probabilities produced by the LLMC. For the model selection, evaluation used OpenAI's Codex as the LLMC, specifically, the completion model. Evaluation found that other models, such as Codex Edit, did not perform as well. The temperature was set to 0.8 based on preliminary experiments.

Evaluation results also show that the addition of few-shot learning, by leveraging the availability of other student's incorrect and correct versions paired with test-case-based few-shot selection strategy, can raise MMAPR's overall repair rate to 96.50%. The increase in repairs does not raise average token edit distance (31.29). In this setting, MMAPR outperformed the baseline by 29.37 percentage points in terms of repair rates and reduced average token edit distance by 26.38%.

In the syntax stage, MMAPR first extracts program chunks from the original buggy program. Evaluation found that program chunking can reduce the average token edit distance up to 56.32% (problem assignment 2878). Overall, the average token edit distance is reduced from 9.38 to 5.46 (41.79%) by adding program chunking.

Evaluation found that splitting concerns into two phases results in an increase in the overall repair rate from 82.87% to 86.71%. Using two phases increases the average token edit distance slightly (30.29 to 31.40).

As to multimodal prompts, MMAPR combines different types of input (code, natural language, test cases) into its prompts. This richness of inputs is a particular advantage of the educational setting. MMAPR ensembles these various prompts by querying the LLMC and then relying on the (syntax or semantics) oracle to filter out candidates. Different prompts may produce complementary candidates. In practice, different prompt structures result in different overall performances in terms of fix rate. If a single prompt structure needs to be chosen, Program+Diagnostics+Description+Tests structure is most effective in this experiment. However, placing the candidates in an ensemble obtained the best result as candidates are complementary.

Technical Character

The technical character of embodiments described herein will be apparent to one of ordinary skill in the art, and will also be apparent in several ways to a wide range of attentive readers. Some embodiments address technical and computational activities such as improving source code and querying machine learning models with automatically generated prompts, which are each an activity deeply rooted in computing technology. Some of the technical mechanisms discussed include, e.g., code improvement software 302 such as code transformers 306, 310, machine learning models 208, and source code parsers 122. Some of the technical effects discussed include, e.g., repair of source code syntax errors and mitigation of source code semantic errors, in a practical application 202 which takes flawed source code 210 as an input and produces improved source code 212 as an output. Thus, purely mental processes and activities limited to pen-and-paper are clearly excluded. Other advantages based on the technical characteristics of the teachings will also be apparent to one of skill from the description provided.

Different embodiments provide different technical benefits or other advantages in different circumstances, but one of skill informed by the teachings herein will acknowledge that particular technical advantages will likely follow from particular innovation features or feature combinations, as noted at various points herein. Any generic or abstract aspects are integrated into a practical application such as an enhanced tool 202 which teaches software development skills to students.

Some embodiments described herein may be viewed by some people in a broader context. For instance, concepts such as efficiency, reliability, user satisfaction, or waste may be deemed relevant to a particular embodiment. However, it does not follow from the availability of a broad context that exclusive rights are being sought herein for abstract ideas; they are not. Rather, the present disclosure is focused on providing appropriately specific embodiments whose technical effects fully or partially solve particular technical problems, such as how to detect and correct bugs in source code 130, and how to optimize automatic code repair for an educational context as opposed to a commercial development context. Other configured storage media, systems, and processes involving efficiency, reliability, user satisfaction, or waste are outside the present scope. Accordingly, vagueness, mere abstractness, lack of technical character, and accompanying proof problems are also avoided under a proper understanding of the present disclosure.

Additional Combinations and Variations

Any of these combinations of software code, data structures, logic, components, communications, and/or their functional equivalents may also be combined with any of the systems and their variations described above. A process may include any steps described herein in any subset or combination or sequence which is operable. Each variant may occur alone, or in combination with any one or more of the other variants. Each variant may occur with any of the processes and each process may be combined with any one or more of the other processes. Each process or combination of processes, including variants, may be combined with any of the configured storage medium combinations and variants described above.

More generally, one of skill will recognize that not every part of this disclosure, or any particular details therein, are necessarily required to satisfy legal criteria such as enablement, written description, or best mode. Also, embodiments are not limited to the particular scenarios, motivating examples, operating environments, peripherals, software process flows, identifiers, data structures, data selections, naming conventions, notations, control flows, or other implementation choices described herein. Any apparent conflict with any other patent disclosure, even from the owner of the present innovations, has no role in interpreting the claims presented in this patent disclosure.

ACRONYMS, ABBREVIATIONS, NAMES, AND SYMBOLS

Some acronyms, abbreviations, names, and symbols are defined below. Others are defined elsewhere herein, or do not require definition here in order to be understood by one of skill.

ALU: arithmetic and logic unit
API: application program interface
BIOS: basic input/output system
CD: compact disc
CPU: central processing unit
DVD: digital versatile disk or digital video disc
FPGA: field-programmable gate array
FPU: floating point processing unit
GDPR: General Data Protection Regulation
GPU: graphical processing unit
GUI: graphical user interface
HTTPS: hypertext transfer protocol, secure
IaaS or IAAS: infrastructure-as-a-service
ID: identification or identity
LAN: local area network
OS: operating system
PaaS or PAAS: platform-as-a-service
RAM: random access memory
ROM: read only memory
TPU: tensor processing unit
UEFI: Unified Extensible Firmware Interface
UI: user interface
WAN: wide area network Some Additional Terminology Reference is made herein to exemplary embodiments such as those illustrated in the drawings, and specific language is used herein to describe the same. But alterations and further modifications of the features illustrated herein, and additional technical applications of the abstract principles illustrated by particular embodiments herein, which would occur to one skilled in the relevant art(s) and having possession of this disclosure, should be considered within the scope of the claims.

The meaning of terms is clarified in this disclosure, so the claims should be read with careful attention to these clarifications. Specific examples are given, but those of skill in the relevant art(s) will understand that other examples may also fall within the meaning of the terms used, and within the scope of one or more claims. Terms do not necessarily have the same meaning here that they have in general usage (particularly in non-technical usage), or in the usage of a particular industry, or in a particular dictionary or set of dictionaries. Reference numerals may be used with various phrasings, to help show the breadth of a term. Omission of a reference numeral from a given piece of text does not necessarily mean that the content of a Figure is not being discussed by the text. The present disclosure asserts and exercises the right to specific and chosen lexicography. Quoted terms are being defined explicitly, but a term may also be defined implicitly without using quotation marks. Terms may be defined, either explicitly or implicitly, here in the Detailed Description and/or elsewhere in the application file.

A "computer system" (a.k.a. "computing system") may include, for example, one or more servers, motherboards, processing nodes, laptops, tablets, personal computers (portable or not), personal digital assistants, smartphones, smartwatches, smart bands, cell or mobile phones, other mobile devices having at least a processor and a memory, video game systems, augmented reality systems, holographic projection systems, televisions, wearable computing systems, and/or other device(s) providing one or more processors controlled at least in part by instructions. The instructions may be in the form of firmware or other software in memory and/or specialized circuitry.

A "multithreaded" computer system is a computer system which supports multiple execution threads. The term "thread" should be understood to include code capable of or subject to scheduling, and possibly to synchronization. A thread may also be known outside this disclosure by another name, such as "task," "process," or "coroutine," for example. However, a distinction is made herein between threads and processes, in that a thread defines an execution path inside a process. Also, threads of a process share a given address space, whereas different processes have different respective address spaces. The threads of a process may run in parallel, in sequence, or in a combination of parallel execution and sequential execution (e.g., time-sliced).

A "processor" is a thread-processing unit, such as a core in a simultaneous multithreading implementation. A processor includes hardware. A given chip may hold one or more processors. Processors may be general purpose, or they may be tailored for specific uses such as vector processing, graphics processing, signal processing, floating-point arithmetic processing, encryption, I/O processing, machine learning, and so on.

"Kernels" include operating systems, hypervisors, virtual machines, BIOS or UEFI code, and similar hardware interface software.

"Code" means processor instructions, data (which includes constants, variables, and data structures), or both instructions and data. "Code" and "software" are used interchangeably herein. Executable code, interpreted code, and firmware are some examples of code.

"Program" is used broadly herein, to include applications, kernels, drivers, interrupt handlers, firmware, state machines, libraries, and other code written by programmers (who are also referred to as developers) and/or automatically generated.

A "routine" is a callable piece of code which normally returns control to an instruction just after the point in a program execution at which the routine was called. Depending on the terminology used, a distinction is sometimes made elsewhere between a "function" and a "procedure": a function normally returns a value, while a procedure does not. As used herein, "routine" includes both functions and procedures. A routine may have code that returns a value (e.g., sin(x)) or it may simply return without also providing a value (e.g., void functions).

"Service" means a consumable program offering, in a cloud computing environment or other network or computing system environment, which provides resources to multiple programs or provides resource access to multiple programs, or does both. A service implementation may itself include multiple applications or other programs.

"Cloud" means pooled resources for computing, storage, and networking which are elastically available for measured on-demand service. A cloud may be private, public, community, or a hybrid, and cloud services may be offered in the form of infrastructure as a service (IaaS), platform as a service (PaaS), software as a service (SaaS), or another service. Unless stated otherwise, any discussion of reading from a file or writing to a file includes reading/writing a local file or reading/writing over a network, which may be a cloud network or other network, or doing both (local and networked read/write). A cloud may also be referred to as a "cloud environment" or a "cloud computing environment".

"Access" to a computational resource includes use of a permission or other capability to read, modify, write, execute, move, delete, create, or otherwise utilize the resource. Attempted access may be explicitly distinguished from actual access, but "access" without the "attempted" qualifier includes both attempted access and access actually performed or provided.

Herein, activity by a user refers to activity by a user device or activity by a user account, or by software on behalf of a user, or by hardware on behalf of a user. Activity is represented by digital data or machine operations or both in a computing system. Activity within the scope of any claim based on the present disclosure excludes human actions per se. Software or hardware activity "on behalf of a user" accordingly refers to software or hardware activity on behalf of a user device or on behalf of a user account or on behalf of another computational mechanism or computational artifact, and thus does not bring human behavior per se within the scope of any embodiment or any claim.

"Digital data" means data in a computing system, as opposed to data written on paper or thoughts in a person's mind, for example. Similarly, "digital memory" refers to a non-living device, e.g., computing storage hardware, not to human or other biological memory.

As used herein, "include" allows additional elements (i.e., includes means comprises) unless otherwise stated.

"Optimize" means to improve, not necessarily to perfect. For example, it may be possible to make further improvements in a program or an algorithm which has been optimized.

"Process" is sometimes used herein as a term of the computing science arts, and in that technical sense encompasses computational resource users, which may also include or be referred to as coroutines, threads, tasks, interrupt handlers, application processes, kernel processes, procedures, or object methods, for example. As a practical matter, a "process" is the computational entity identified by system utilities such as Windows® Task Manager, Linux® ps, or similar utilities in other operating system environments (marks of Microsoft Corporation, Linus Torvalds, respectively). "Process" is also used herein as a patent law term of art, e.g., in describing a process claim as opposed to a system claim or an article of manufacture (configured storage medium) claim. Similarly, "method" is used herein at times as a technical term in the computing science arts (a kind of "routine") and also as a patent law term of art (a "process"). "Process" and "method" in the patent law sense are used interchangeably herein. Those of skill will understand which meaning is intended in a particular instance, and will also understand that a given claimed process or method (in the patent law sense) may sometimes be implemented using one or more processes or methods (in the computing science sense).

"Automatically" means by use of automation (e.g., general purpose computing hardware configured by software for specific operations and technical effects discussed herein), as opposed to without automation. In particular, steps performed "automatically" are not performed by hand on paper or in a person's mind, although they may be initiated by a human person or guided interactively by a human person. Automatic steps are performed with a machine in order to obtain one or more technical effects that would not be realized without the technical interactions thus provided. Steps performed automatically are presumed to include at least one operation performed proactively.

One of skill understands that technical effects are the presumptive purpose of a technical embodiment. The mere fact that calculation is involved in an embodiment, for example, and that some calculations can also be performed without technical components (e.g., by paper and pencil, or even as mental steps) does not remove the presence of the technical effects or alter the concrete and technical nature of the embodiment, particularly in real-world embodiment implementations. Code improvement operations such as syntactic phase 304 operations, semantic phase 308 operations, and other functionality 206 operations discussed herein, are understood to be inherently digital. A human mind cannot interface directly with a CPU or other processor, or with RAM or other digital storage, to read and write the necessary data to perform the code improvement steps 1100 taught herein even in a hypothetical prototype situation, much less in an embodiment's real world large computing environment. This would all be well understood by persons of skill in the art in view of the present disclosure.

"Computationally" likewise means a computing device (processor plus memory, at least) is being used, and excludes obtaining a result by mere human thought or mere human action alone. For example, doing arithmetic with a paper and pencil is not doing arithmetic computationally as understood herein. Computational results are faster, broader, deeper, more accurate, more consistent, more comprehensive, and/or otherwise provide technical effects that are beyond the scope of human performance alone. "Computational steps" are steps performed computationally. Neither "automatically" nor "computationally" necessarily means "immediately". "Computationally" and "automatically" are used interchangeably herein.

"Proactively" means without a direct request from a user. Indeed, a user may not even realize that a proactive step by an embodiment was possible until a result of the step has been presented to the user. Except as otherwise stated, any computational and/or automatic step described herein may also be done proactively.

"Based on" means based on at least, not based exclusively on. Thus, a calculation based on X depends on at least X, and may also depend on Y.

Throughout this document, use of the optional plural "(s)", "(es)", or "(ies)" means that one or more of the indicated features is present. For example, "processor(s)" means "one or more processors" or equivalently "at least one processor".

"At least one" of a list of items means one of the items, or two of the items, or three of the items, and so on up to and including all N of the items, where the list is a list of N items. The presence of an item in the list does not require the presence of the item (or a check for the item) in an embodiment. For instance, if an embodiment of a system is described herein as including at least one of A, B, C, or D, then a system that includes A but does not check for B or C or D is an embodiment, and so is a system that includes A and also includes B but does not include or check for C or D. Similar understandings pertain to items which are steps or step portions or options in a method embodiment. This is not a complete list of all possibilities; it is provided merely to aid understanding of the scope of "at least one" that is intended herein.

For the purposes of United States law and practice, use of the word "step" herein, in the claims or elsewhere, is not intended to invoke means-plus-function, step-plus-function, or 35 United State Code Section 112 Sixth Paragraph/Section 112(f) claim interpretation. Any presumption to that effect is hereby explicitly rebutted.

For the purposes of United States law and practice, the claims are not intended to invoke means-plus-function interpretation unless they use the phrase "means for". Claim language intended to be interpreted as means-plus-function language, if any, will expressly recite that intention by using the phrase "means for". When means-plus-function interpretation applies, whether by use of "means for" and/or by a court's legal construction of claim language, the means recited in the specification for a given noun or a given verb should be understood to be linked to the claim language and linked together herein by virtue of any of the following: appearance within the same block in a block diagram of the figures, denotation by the same or a similar name, denotation by the same reference numeral, a functional relationship depicted in any of the figures, a functional relationship noted in the present disclosure's text. For example, if a claim limitation recited a "zac widget" and that claim limitation became subject to means-plus-function interpretation, then at a minimum all structures identified anywhere in the specification in any figure block, paragraph, or example mentioning "zac widget", or tied together by any reference numeral assigned to a zac widget, or disclosed as having a functional relationship with the structure or operation of a zac widget, would be deemed part of the structures identified in the application for zac widgets and would help define the set of equivalents for zac widget structures.

One of skill will recognize that this innovation disclosure discusses various data values and data structures, and recognize that such items reside in a memory (RAM, disk, etc.), thereby configuring the memory. One of skill will also recognize that this innovation disclosure discusses various algorithmic steps which are to be embodied in executable code in a given implementation, and that such code also resides in memory, and that it effectively configures any general-purpose processor which executes it, thereby transforming it from a general-purpose processor to a special-purpose processor which is functionally special-purpose hardware.

Accordingly, one of skill would not make the mistake of treating as non-overlapping items (a) a memory recited in a claim, and (b) a data structure or data value or code recited in the claim. Data structures and data values and code are understood to reside in memory, even when a claim does not explicitly recite that residency for each and every data structure or data value or piece of code mentioned. Accordingly, explicit recitals of such residency are not required. However, they are also not prohibited, and one or two select recitals may be present for emphasis, without thereby excluding all the other data values and data structures and code from residency. Likewise, code functionality recited in a claim is understood to configure a processor, regardless of whether that configuring quality is explicitly recited in the claim.

Throughout this document, unless expressly stated otherwise any reference to a step in a process presumes that the step may be performed directly by a party of interest and/or performed indirectly by the party through intervening mechanisms and/or intervening entities, and still lie within the scope of the step. That is, direct performance of the step by the party of interest is not required unless direct performance is an expressly stated requirement. For example, a computational step on behalf of a party of interest, such as chunking, confirming, extracting, generating, identifying, improving, interfacing, learning, measuring, minimizing, mitigating, obtaining, outputting, producing, receiving, repairing, selecting, submitting, transforming, utilizing (and chunks, chunked, confirms, confirmed, etc.) with regard to a destination or other subject may involve intervening action, such as the foregoing or such as forwarding, copying, uploading, downloading, encoding, decoding, compressing, decompressing, encrypting, decrypting, authenticating, invoking, and so on by some other party or mechanism, including any action recited in this document, yet still be understood as being performed directly by or on behalf of the party of interest.

Whenever reference is made to data or instructions, it is understood that these items configure a computer-readable memory and/or computer-readable storage medium, thereby transforming it to a particular article, as opposed to simply existing on paper, in a person's mind, or as a mere signal being propagated on a wire, for example. For the purposes of patent protection in the United States, a memory or other computer-readable storage medium is not a propagating signal or a carrier wave or mere energy outside the scope of patentable subject matter under United States Patent and Trademark Office (USPTO) interpretation of the In re Nuijten case. No claim covers a signal per se or mere energy in the United States, and any claim interpretation that asserts otherwise in view of the present disclosure is unreasonable on its face. Unless expressly stated otherwise in a claim granted outside the United States, a claim does not cover a signal per se or mere energy.

Moreover, notwithstanding anything apparently to the contrary elsewhere herein, a clear distinction is to be understood between (a) computer readable storage media and computer readable memory, on the one hand, and (b) transmission media, also referred to as signal media, on the other hand. A transmission medium is a propagating signal or a carrier wave computer readable medium. By contrast, computer readable storage media and computer readable memory are not propagating signal or carrier wave computer readable media. Unless expressly stated otherwise in the claim, "computer readable medium" means a computer readable storage medium, not a propagating signal per se and not mere energy.

An "embodiment" herein is an example. The term "embodiment" is not interchangeable with "the invention". Embodiments may freely share or borrow aspects to create other embodiments (provided the result is operable), even if a resulting combination of aspects is not explicitly described per se herein. Requiring each and every permitted combination to be explicitly and individually described is unnecessary for one of skill in the art, and would be contrary to policies which recognize that patent specifications are written for readers who are skilled in the art. Formal combinatorial calculations and informal common intuition regarding the number of possible combinations arising from even a small number of combinable features will also indicate that a large number of aspect combinations exist for the aspects described herein. Accordingly, requiring an explicit recitation of each and every combination would be contrary to policies calling for patent specifications to be concise and for readers to be knowledgeable in the technical fields concerned.

LIST OF REFERENCE NUMERALS

The following list is provided for convenience and in support of the drawing figures and as part of the text of the specification, which describe innovations by reference to multiple items. Items not listed here may nonetheless be part of a given embodiment. For better legibility of the text, a given reference number is recited near some, but not all, recitations of the referenced item in the text. The same reference number may be used with reference to different examples or different instances of a given item. The list of reference numerals is:

- 100 operating environment, also referred to as computing environment; includes one or more systems 102
- 101 machine in a system 102, e.g., any device having at least a processor 110 and a memory 112 and also having a distinct identifier such as an IP address or a MAC (media access control) address; may be a physical machine or be a virtual machine implemented on physical hardware
- 102 computer system, also referred to as a "computational system" or "computing system", and when in a network may be referred to as a "node"
- 104 users, e.g., user of an enhanced system 202
- 106 peripheral device
- 108 network generally, including, e.g., LANs, WANs, software-defined networks, clouds, and other wired or wireless networks
- 110 processor; includes hardware
- 112 computer-readable storage medium, e.g., RAM, hard disks
- 114 removable configured computer-readable storage medium
- 116 instructions executable with processor; may be on removable storage media or in other memory (volatile or nonvolatile or both)
- 118 digital data in a system 102; data structures, values, software, artifacts, and other examples are discussed herein
- 120 kernel(s), e.g., operating system(s), BIOS, UEFI, device drivers
- 122 compiler, integrated development environment, editor, parser, analyzer, or other software tool; may be a locally installed application, or be provided as software-as-a-service, or be otherwise implemented for use on a system 102
- 124 user interface, e.g., of a tool 122 or kernel 120 in a system 102; software and hardware
- 126 display screens, also referred to as "displays"
- 128 computing hardware not otherwise associated with a reference number 106, 108, 110, 112, 114
- 130 source code, as represented in a system 102
- 132 source code generator; computational
- 134 cloud, also referred to as cloud environment or cloud computing environment
- 202 enhanced computing system, i.e., system 102 enhanced with code improvement functionality 206
- 204 code improvement, e.g., removal or other repair or mitigation of an error, or a performance improvement, or an improvement in understandability
- 206 functionality for code improvement as taught herein; e.g., software or specialized hardware which performs or is configured to perform steps 1002 or 1004 plus steps 1006 and 1010, or steps 1006 and 1008 and 1010, or any software or hardware which performs or is configured to perform a process 1100 or a computational code improvement activity first disclosed herein
- 208 machine learning model; computational
- 210 source code containing an error, as represented in a system 102
- 212 improved source code, as represented in a system 102
- 302 software which upon execution provides functionality 206
- 304 syntactic phase (also referred to as syntax phase 304), as represented in a system 202
- 306 syntactic phase code transformer; computational
- 308 semantic phase, as represented in a system 202
- 310 semantic phase code transformer; computational
- 312 interface to a model 208, e.g., API
- 314 software performance metric, as represented in a system 202
- 316 interface generally
- 602 program chunker; computational
- 604 syntactic prompt (a.k.a. syntax prompt) generator; computational
- 606 ensembler; computational
- 608 syntax oracle; computational
- 610 syntax error message, a.k.a. diagnostic; digital
- 702 peer program; digital; an example of source code 130
- 704 test case, a.k.a. test suite; computational or digital or both
- 706 task description; digital
- 708 few shot selection mechanism; computational
- 710 semantic prompt generator; computational
- 712 semantic oracle; computational
- 902 candidate version of source code 130
- 904 syntax error, as represented in a system 102
- 906 syntax prompt; digital
- 908 semantic prompt; digital
- 910 dataset from which semantic prompt is built; digital
- 912 reserved word in source code 130
- 914 semantic error, as represented in a system 102
- 916 edit distance; digital
- 918 indentation in formatted source code 130
- 920 chunk of source code 130
- 1000 flowchart; 1000 also refers to code improvement processes that are illustrated by or consistent with the FIG. 10 flowchart
- 1002 computationally repair syntax error
- 1004 computationally confirm no syntax errors remain in source code
- 1006 computationally generate a prompt
- 1008 computationally submit a prompt to a model 208, e.g., via API
- 1010 computationally obtain a candidate version of code from a model 208, e.g., via API
- 1012 computationally select a candidate from among multiple candidates
- 1014 computationally output a candidate as being an improved source code 212, e.g., via API

1100 flowchart; 1100 also refers to code improvement processes that are illustrated by or consistent with the FIG. 11 flowchart (which incorporates the FIG. 10 flowchart)

1102 computationally minimize edit distance

1104 computationally extract a code chunk

1106 computationally utilize code 702 for few-shot learning

1108 few-shot learning; computational

1110 computationally utilize prompt content from a programming instructor

1112 computationally identify a syntax error

1114 computationally receive a code chunk

1116 computationally produce a prompt

1118 computationally receive a prompt

1120 any step or item discussed in the present disclosure that has not been assigned some other reference numeral; 1120 may thus be shown expressly as a reference numeral for various steps or items or both, and may be added as a reference numeral (in the current disclosure or any subsequent patent application which claims priority to the current disclosure) for various steps or items or both without thereby adding new matter

CONCLUSION

Some embodiments generate prompts and submit them in queries to a language model 208 trained on code to perform automated program repair. Some embodiments fix syntactic mistakes and semantic mistakes by combining multimodal prompts, iterative querying, test-case-based selection of few-shots, and program chunking. In some cases, edit distance 916 is minimized between an initial flawed program and the automatically created improved version of that program. The initial flawed program is obtained from a programming student, or from a source code generator 132.

Embodiments are understood to also themselves include or benefit from tested and appropriate security controls and privacy controls such as the General Data Protection Regulation (GDPR). Use of the tools and techniques taught herein is compatible with use of such controls.

Although Microsoft technology is used in some motivating examples, the teachings herein are not limited to use in technology supplied or administered by Microsoft. Under a suitable license, for example, the present teachings could be embodied in software or services provided by other cloud service providers.

Although particular embodiments are expressly illustrated and described herein as processes, as configured storage media, or as systems, it will be appreciated that discussion of one type of embodiment also generally extends to other embodiment types. For instance, the descriptions of processes in connection with the Figures also help describe configured storage media, and help describe the technical effects and operation of systems and manufactures like those discussed in connection with other Figures. It does not follow that any limitations from one embodiment are necessarily read into another. In particular, processes are not necessarily limited to the data structures and arrangements presented while discussing systems or manufactures such as configured memories.

Those of skill will understand that implementation details may pertain to specific code, such as specific thresholds, comparisons, specific kinds of platforms or programming languages or architectures, specific scripts or other tasks, and specific computing environments, and thus need not appear in every embodiment. Those of skill will also understand that program identifiers and some other terminology used in discussing details are implementation-specific and thus need not pertain to every embodiment. Nonetheless, although they are not necessarily required to be present here, such details may help some readers by providing context and/or may illustrate a few of the many possible implementations of the technology discussed herein.

With due attention to the items provided herein, including technical processes, technical effects, technical mechanisms, and technical details which are illustrative but not comprehensive of all claimed or claimable embodiments, one of skill will understand that the present disclosure and the embodiments described herein are not directed to subject matter outside the technical arts, or to any idea of itself such as a principal or original cause or motive, or to a mere result per se, or to a mental process or mental steps, or to a business method or prevalent economic practice, or to a mere method of organizing human activities, or to a law of nature per se, or to a naturally occurring thing or process, or to a living thing or part of a living thing, or to a mathematical formula per se, or to isolated software per se, or to a merely conventional computer, or to anything wholly imperceptible or any abstract idea per se, or to insignificant post-solution activities, or to any method implemented entirely on an unspecified apparatus, or to any method that fails to produce results that are useful and concrete, or to any preemption of all fields of usage, or to any other subject matter which is ineligible for patent protection under the laws of the jurisdiction in which such protection is sought or is being licensed or enforced.

Reference herein to an embodiment having some feature X and reference elsewhere herein to an embodiment having some feature Y does not exclude from this disclosure embodiments which have both feature X and feature Y, unless such exclusion is expressly stated herein. All possible negative claim limitations are within the scope of this disclosure, in the sense that any feature which is stated to be part of an embodiment may also be expressly removed from inclusion in another embodiment, even if that specific exclusion is not given in any example herein. The term "embodiment" is merely used herein as a more convenient form of "process, system, article of manufacture, configured computer readable storage medium, and/or other example of the teachings herein as applied in a manner consistent with applicable law." Accordingly, a given "embodiment" may include any combination of features disclosed herein, provided the embodiment is consistent with at least one claim.

Not every item shown in the Figures need be present in every embodiment. Conversely, an embodiment may contain item(s) not shown expressly in the Figures. Although some possibilities are illustrated here in text and drawings by specific examples, embodiments may depart from these examples. For instance, specific technical effects or technical features of an example may be omitted, renamed, grouped differently, repeated, instantiated in hardware and/or software differently, or be a mix of effects or features appearing in two or more of the examples. Functionality shown at one location may also be provided at a different location in some embodiments; one of skill recognizes that functionality modules can be defined in various ways in a given implementation without necessarily omitting desired technical effects from the collection of interacting modules viewed as a whole. Distinct steps may be shown together in a single box in the Figures, due to space limitations or for convenience, but nonetheless be separately performable, e.g., one may be performed without the other in a given performance of a method.

Reference has been made to the figures throughout by reference numerals. Any apparent inconsistencies in the phrasing associated with a given reference numeral, in the figures or in the text, should be understood as simply broadening the scope of what is referenced by that numeral. Different instances of a given reference numeral may refer to different embodiments, even though the same reference numeral is used. Similarly, a given reference numeral may be used to refer to a verb, a noun, and/or to corresponding instances of each, e.g., a processor 110 may process 110 instructions by executing them.

As used herein, terms such as "a", "an", and "the" are inclusive of one or more of the indicated item or step. In particular, in the claims a reference to an item generally means at least one such item is present and a reference to a step means at least one instance of the step is performed. Similarly, "is" and other singular verb forms should be understood to encompass the possibility of "are" and other plural forms, when context permits, to avoid grammatical errors or misunderstandings.

Headings are for convenience only; information on a given topic may be found outside the section whose heading indicates that topic.

All claims and the abstract, as filed, are part of the specification. The abstract is provided for convenience and for compliance with patent office requirements; it is not a substitute for the claims and does not govern claim interpretation in the event of any apparent conflict with other parts of the specification. Similarly, the summary is provided for convenience and does not govern in the event of any conflict with the claims or with other parts of the specification. Claim interpretation shall be made in view of the specification as understood by one of skill in the art; innovators are not required to recite every nuance within the claims themselves as though no other disclosure was provided herein.

To the extent any term used herein implicates or otherwise refers to an industry standard, and to the extent that applicable law requires identification of a particular version of such as standard, this disclosure shall be understood to refer to the most recent version of that standard which has been published in at least draft form (final form takes precedence if more recent) as of the earliest priority date of the present disclosure under applicable patent law.

While exemplary embodiments have been shown in the drawings and described above, it will be apparent to those of ordinary skill in the art that numerous modifications can be made without departing from the principles and concepts set forth in the claims, and that such modifications need not encompass an entire abstract concept. Although the subject matter is described in language specific to structural features and/or procedural acts, it is to be understood that the subject matter defined in the appended claims is not necessarily limited to the specific technical features or acts described above the claims. It is not necessary for every means or aspect or technical effect identified in a given definition or example to be present or to be utilized in every embodiment. Rather, the specific features and acts and effects described are disclosed as examples for consideration when implementing the claims.

All changes which fall short of enveloping an entire abstract idea but come within the meaning and range of equivalency of the claims are to be embraced within their scope to the full extent permitted by law.

What is claimed is:

1. A source code improvement process performed by a computing system to improve a first version of a source code, the process comprising:
   a phased iterative process performed in the computing system, the phased iterative process comprising:
   repairing any syntax errors in the first version of the source code or confirming that the first version of the source code is free of syntax errors, or both, thereby yielding a syntactically correct version of the source code;
   generating a multimodal prompt which includes at least two of the following: a portion of the syntactically correct version of the source code, a natural language description of a task to be accomplished by any improved version of the source code, or a test case to be satisfied by the improved version of the source code;
   submitting the multimodal prompt to a machine learning model trained on source codes;
   obtaining candidate versions of the improved version of the source code from the machine learning model trained on source codes;
   selecting a valid candidate version of the improved version of the source code from among the candidate versions; and
   outputting the selected valid candidate version;
   whereby the phased iterative process results in an overall higher fix rate than an approach which attempts to fix syntax and semantics in a single combined stage.

2. The process of claim 1, wherein the multimodal prompt includes: the portion of the syntactically correct version of the source code, and the natural language description of the task to be accomplished by any improved version of the source code.

3. The process of claim 1, wherein the multimodal prompt includes: the portion of the syntactically correct version of the source code, and the test case to be satisfied by the improved version of the source code.

4. The process of claim 1, wherein the multimodal prompt includes: the portion of the syntactically correct version of the source code, the natural language description of the task to be accomplished by any improved version of the source code, and the test case to be satisfied by the improved version of the source code.

5. The process of claim 1, wherein selecting the valid candidate version of the improved version of the source code from among the candidate versions comprises minimizing a distance between the candidate versions and the first version of the source code.

6. The process of claim 1, wherein the process comprises repairing a syntax error in the first version of the source code, and the repairing comprises: generating a syntactic prompt which includes the syntax error, submitting the syntactic prompt to the machine learning model trained on source codes, and getting a syntax error correction from the machine learning model trained on source codes.

7. The process of claim 6, wherein generating the syntactic prompt comprises extracting a code chunk of the first version of the source code, and the extracting is based on a location of the syntax error and also based on at least one of the following: a programming language reserved word location in the first version of the source code, or a formatting indentation in the first version of the source code.

8. The process of claim 1, further comprising utilizing alternate versions of the source code in few-shot learning by the machine learning model trained on source codes.

9. The process of claim 1, wherein the process is suitable for improving programs written by students in at least one of the following ways:
- the first version of the source code and the selected valid candidate version are each no longer than fifty lines;
- an instructor-provided alternative to the selected valid candidate version is included in a prompt to the machine learning model trained on source codes;
- an instructor-provided natural language description of the task to be accomplished by any improved version of the source code is included in a prompt to the machine learning model trained on source codes; or
- an instructor-provided edge test case is included in a prompt to the machine learning model trained on source codes.

10. A computing system which is configured to receive as input a first version of a source code which is a portion of a program, and configured to produce as output an improved second version of the source code, the computing system comprising:
- a digital memory;
- a processor set including at least one processor, the processor set in operable communication with the digital memory;
- a model interface to a machine learning model; and
- at least one of: (i) a syntactic phase code transformer comprising a syntax checker, a program chunker, and a syntactic prompt generator, or (ii) a semantic phase code transformer comprising a semantic prompt generator and a candidate validity tester;
- wherein upon execution of the syntactic phase code transformer by the processor set, the syntax checker identifies a syntax error in the first version of the source code, the program chunker extracts a code chunk from the first version of the source code, the code chunk including the syntax error, the syntactic prompt generator receives the code chunk and produces a syntactic prompt which contains the syntax error, and the model interface receives the syntactic prompt and produces at least a portion of the second version of the source code in which the syntax error has been repaired, thereby providing improved performance of the source code of the program; or
- wherein upon execution of the semantic phase code transformer by the processor set, the semantic prompt generator receives a semantic prompt dataset which includes a syntactically correct version of the source code which contains a semantic error, the semantic prompt dataset also including a test suite, the semantic prompt generator produces multiple semantic prompts which permute the semantic prompt dataset, the model interface receives the semantic prompts and produces candidate versions of the source code, the candidate validity tester selects a candidate version which is syntactically correct and which also passes the test suite, and the semantic phase code transformer produces the selected candidate version which the system includes in the second version of the source code in which the semantic error has been mitigated, thereby providing improved performance of the program.

11. The computing system of claim 10, comprising both the syntactic phase code transformer and the semantic phase code transformer.

12. The computing system of claim 10, comprising the semantic phase code transformer, wherein the second version of the source code in which the semantic error has been mitigated has improved performance over the syntactically correct version of the source code which contains a semantic error, the improved performance measured with respect to at least one of the following performance metrics: execution time, volatile memory usage, nonvolatile memory usage, bandwidth usage, or electric power consumption.

13. The computing system of claim 10, comprising the semantic phase code transformer, wherein the semantic prompt dataset includes a task description in a natural language.

14. The computing system of claim 10, further comprising a source code generator, and wherein at least one of the following is an output of the source code generator: the first version of the source code which is input to the syntactic phase code transformer, or the syntactically correct version of the source code which contains the semantic error and which is input to the semantic phase code transformer.

15. A computer-readable storage device configured with data and instructions which upon execution by a processor cause a computing system to perform a source code improvement process to improve a first version of a source code which is a portion of a program, the process comprising:
- a phased iterative process performed in the computing system, the phased iterative process comprising:
  - repairing any syntax errors in the first version of the source code or confirming that the first version of the source code is free of syntax errors, or both, thereby yielding a syntactically correct version of the source code;
  - submitting a multimodal prompt to a machine learning model;
  - receiving candidate versions of the improved version of the source code from the machine learning model;
  - selecting a valid candidate version of the improved version of the source code from among the candidate versions; and
  - outputting the selected valid candidate version;
- whereby the phased iterative process results in at least one of: an improved performance of the source code of the program as a result of a repair of a source code syntax error, or an improved performance of the program as a result of a mitigation of a source code semantic error.

16. The storage device of claim 15, wherein the process comprises repairing any syntax errors in the first version of the source code, the repairing comprises submitting to the machine learning model a first syntactic prompt which contains the syntax error and submitting to the machine learning model a second syntactic prompt which does not contain the syntax error, and getting a syntax error correction from the machine learning model in response to at least the first syntactic prompt and the second syntactic prompt.

17. The storage device of claim 15, wherein the process comprises repairing any syntax errors in the first version of the source code, the repairing comprises submitting to the machine learning model a code chunk, and the code chunk includes a control-flow statement which encompasses the syntax error.

18. The storage device of claim 15, wherein the process is suitable for improving programs written by students in at least one of the following ways:
- an instructor-provided alternative to the selected valid candidate version is included in a prompt to the machine learning model;
- an instructor-provided natural language description of the task to be accomplished by any improved version of the source code is included in a prompt to the machine learning model; or an instructor-provided edge test case is included in a prompt to the machine learning model.

19. The storage device of claim 15, wherein the process comprises prompting the machine learning model with a syntactic prompt, utilizing a machine learning model response to the syntactic prompt to repair a syntax error in the first version of the source code, then prompting the machine learning model with a semantic prompt, and including a machine learning model response to the semantic prompt in the selected valid candidate version.

20. The storage device of claim 15, further comprising training the machine learning model by few-shot learning.

* * * * *